(12) United States Patent
Ichikawa et al.

(10) Patent No.: US 8,058,836 B2
(45) Date of Patent: Nov. 15, 2011

(54) POWER SYSTEM AND METHOD FOR SUPPLYING AC POWER

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 459 days.

(21) Appl. No.: 12/308,772

(22) PCT Filed: Jul. 6, 2007

(86) PCT No.: PCT/JP2007/063943
§ 371 (c)(1),
(2), (4) Date: Dec. 23, 2008

(87) PCT Pub. No.: WO2008/015897
PCT Pub. Date: Feb. 7, 2008

(65) Prior Publication Data
US 2009/0322154 A1 Dec. 31, 2009

(30) Foreign Application Priority Data
Jul. 31, 2006 (JP) .................. 2006-208145

(51) Int. Cl.
*H02J 7/14* (2006.01)
*B60K 8/00* (2006.01)
*H05K 7/14* (2006.01)
*G05D 3/00* (2006.01)

(52) U.S. Cl. ........ 320/104; 320/109; 320/116; 320/139; 180/65.31; 180/69.6; 180/54.1; 307/149; 701/22

(58) Field of Classification Search .................. 320/104
See application file for complete search history.

(56) References Cited

U.S. PATENT DOCUMENTS

| 5,099,186 | A |  | 3/1992 | Rippel et al. |
|---|---|---|---|---|
| 6,104,160 | A | * | 8/2000 | Iwata et al. .................. 320/103 |
| 6,680,547 | B1 | * | 1/2004 | Dailey ............................ 307/31 |
| 2001/0043050 | A1 | * | 11/2001 | Fisher, Jr. ..................... 320/101 |
| 2003/0059654 | A1 |  | 3/2003 | Hsu et al. |
| 2004/0078655 | A1 | * | 4/2004 | Sung .............................. 714/14 |
| 2007/0221422 | A1 | * | 9/2007 | Rosenstock .................. 180/65.3 |

FOREIGN PATENT DOCUMENTS
JP A-4-295202 10/1992
(Continued)

OTHER PUBLICATIONS

Office Action issued in Korean Patent Application No. 10-2009-7004152, dated Sep. 29, 2010 (with English translation).

*Primary Examiner* — Edward Tso
*Assistant Examiner* — Yalkew Fantu
(74) *Attorney, Agent, or Firm* — Oliff & Berridge, PLC

(57) ABSTRACT

Upon receiving a supply start instruction, each vehicle (2, 3, 4) transmits its own identification ID to other vehicles (sequence SQ12, SQ14, SQ16). A vehicle (2) determining that it is a master itself performs notification of master to the vehicles (3, 4) (sequence SQ20) and begins generation of an AC voltage conforming to its own period (sequence SQ22). Each vehicle (3, 4) generates an AC current synchronized with a voltage reference which is the AC voltage generated from the vehicle (2) (sequence SQ26a, SQ26b). In this way, the vehicles (2, 3, 4) cooperate to begin power supply to a power load.

15 Claims, 16 Drawing Sheets

FOREIGN PATENT DOCUMENTS

| | | |
|---|---|---|
| JP | A-6-292304 | 10/1994 |
| JP | A-10-117444 | 5/1998 |
| JP | A-11-178234 | 7/1999 |
| JP | A-2000-209707 | 7/2000 |
| JP | A-2001-8380 | 1/2001 |
| JP | A-2001-501018 | 1/2001 |
| JP | A-2002-8673 | 1/2002 |
| JP | A-2002-247769 | 8/2002 |
| JP | A-2003-264906 | 9/2003 |
| JP | A-2004-173388 | 6/2004 |
| JP | A-2005-210843 | 8/2005 |
| JP | A-2006-158124 | 6/2006 |

* cited by examiner

SUPPLY
VOLTAGE
VAC    PHASE REFERENCE

SUPPLY
CURRENT IAC
( θ(t) )

POWER SYSTEM AND METHOD FOR SUPPLYING AC POWER

TECHNICAL FIELD

The present invention relates to a power system using an electric vehicle configured to allow supply of AC power and to a method of supplying AC power. Specifically, the present invention relates to a technique for implementing supply of AC power from a plurality of electric vehicles to a common power consuming unit.

BACKGROUND ART

Recently, in consideration of environmental issues, vehicles using electric motors as driving power sources such as electric vehicles, hybrid vehicles and fuel cell electric vehicles have been attracting attention. Such a vehicle is provided with a rechargeable electric storage unit for supplying electric power to an electric motor and for converting kinetic energy to electric energy at the time of regenerative braking and for storing the same.

Use of an electric vehicle with such an electric storage unit as an electric power source of a house or the like has been proposed. By way of example, Japanese Patent Laying-Open No. 2001-008380 discloses a power management system that allows transmission of electric power between a house and a battery mounted on an electric vehicle. In the power management system, amount of electric power supplied from the electric vehicle to the house is managed in accordance with the power supplied from the mains to loads in the house.

Electric vehicles such as represented by hybrid vehicles are rapidly becoming common due in part to lower costs enabled by technical innovation. Along with the widespread use of electric vehicles, it is fully expected that a large number of households own a plurality of electric vehicles.

The power management system disclosed in Japanese Patent Laying-Open No. 2001-008380 considers only a configuration in which one electric vehicle is electrically connected to one house, and not a configuration in which a plurality of electric vehicles are electrically connected to one house.

As disclosed in Japanese Patent Laying-Open No. 2001-008380, the electric power supplied from an electric vehicle to the house is not DC power but AC power, so as to enable power supply to loads in the house in coordination with mains power (AC power). Generally, in order to implement coordination among a plurality of AC power sources, voltages, frequencies and phases must be matched with each other. Therefore, it has been difficult to realize the configuration in which a plurality of electric vehicles are electrically connected to one house.

DISCLOSURE OF THE INVENTION

The present invention was made to solve such a problem and its object is to provide a power system and a method of supplying AC power enabling supply of AC power from a plurality of electric vehicles each configured to allow supply of AC power to a common power consuming unit.

According to an aspect, the present invention provides a power system electrically connected to a power consuming unit and allowing transfer of AC power to/from the power consuming unit, including a plurality of electric vehicles each configured to be able to supply AC power, and the plurality of electric vehicles are commonly connected electrically to the power consuming unit. Each of the plurality of electric vehicles includes a rechargeable electric storage unit, an AC power generating unit receiving discharge power from the electric storage unit for generating AC power, a supply line for electrically connecting the AC power generating unit and the power consuming unit, first AC voltage detecting means for detecting an AC voltage appearing on the supply line, and first control means for controlling the AC power generating unit such that when the AC voltage appears on the supply line, an AC current synchronized with the detected AC voltage is generated.

By the present invention, when an AC voltage appears on the supply line before generating the AC power, each electric vehicle controls the AC power generating unit such that an AC current synchronized with the detected AC voltage is generated. Therefore, even when AC power has already been supplied by a commercial power source or another electric vehicle to the power consuming unit, each electric vehicle can additionally be linked. Consequently, AC power can be supplied to the common power consuming unit in a cooperative manner, regardless of the number of electric vehicles.

Preferably, each of the plurality of electric vehicles further includes a communication unit capable of transmission and reception of information to/from other electric vehicle(s), transmitting means for transmitting identification data representing itself to the other electric vehicle(s) via the communication means, receiving means for obtaining the identification data from the other electric vehicle(s) received via the communication means, priority comparing means for comparing the identification data of itself with the identification data of other electric vehicle(s) obtained by the receiving means based on a predetermined determination rule, master notification means for notifying to the other vehicle(s) that it is a master among the plurality of electric vehicles, if priority of the identification data of itself is the highest as compared with the identification data of other vehicle(s), and second control means for controlling the AC power generating unit so that an AC voltage of a predetermined frequency is generated, when no AC voltage appears on the supply line, after the master notification means notifies to the other vehicle(s).

More preferably, the power system in accordance with the present invention further includes a supply management unit for managing supply of AC power from the plurality of electric vehicles. The communication unit is capable of additionally receiving information from the supply management unit, and the supply management unit issues a supply start instruction to each of the plurality of electric vehicles in response to an external instruction. Each of the plurality of electric vehicles starts supply of AC power after receiving the supply start instruction from the supply management unit.

Preferably, the power system in accordance with the present invention further includes a supply management unit for managing supply of AC power from the plurality of electric vehicles. Each of the plurality of electric vehicles further includes a communication unit capable of transmission and reception of information to/from the supply management unit and transmitting means for transmitting identification data representing itself to the supply management unit via the communication means. The supply management unit includes second AC voltage detecting means for detecting an AC voltage supplied to the power consuming unit, identification data obtaining means for obtaining the identification data transmitted from each of the plurality of electric vehicles, priority determining means for determining an electric vehicle of highest priority from the identification data obtained by the identification data obtaining means based on a predetermined determination rule, and generation start instructing means for applying an instruction to start generation of a voltage reference to the electric vehicle determined by the priority determining means, when there is no AC voltage supplied to the power consuming unit. Each of the plurality of electric vehicles further includes second control means for controlling the AC power generating unit such that an AC voltage of predetermined frequency is generated when the generation start instruction is received from the supply management unit.

More preferably, the supply management unit applies the supply start instruction to each of the plurality of electric vehicles in response to an external instruction, and each of the plurality of electric vehicles starts supply of AC power after receiving the supply start instruction from the supply management unit.

Preferably, the first control means establishes synchronization with the AC voltage, based on a timing of zero-cross point of the AC voltage detected by the first AC voltage detecting means.

Preferably, the communication unit is configured to perform information transmission and information reception through the corresponding supply line.

Preferably, the power consuming unit is formed to allow supply of AC power from other than the plurality of electric vehicles, from a node between the plurality of electric vehicles and the power consuming unit.

Preferably, the AC power generating unit includes first and second rotating electric machines each formed to include a star-connected stator, and first and second inverters for driving the first and second rotating electric machines, respectively. The supply line is configured to electrically connect a first neutral point of the first rotating electric machine and a second neutral point of the second rotating electric machine to the power consuming unit, and each of the first and second inverters is capable of switching operation such that a single-phase AC voltage is generated between the first neutral point and the second neutral point.

According to another aspect, the present invention provides a power system electrically connected to a power consuming unit and allowing transfer of AC power to/from the power consuming unit, including a plurality of electric vehicles each configured to be able to supply AC power, and the plurality of electric vehicles are commonly connected electrically to the power consuming unit. Each of the plurality of electric vehicles includes a rechargeable electric storage unit, an AC power generating unit receiving discharge power from the electric storage unit for generating AC power, a supply line for electrically connecting the AC power generating unit and the power consuming unit, a supply voltage detecting unit detecting a voltage appearing on the supply line, and a control unit. The control unit controls the AC power generating unit such that, when the supply voltage detecting unit detects an AC voltage appearing on the supply line, an AC current synchronized with the detected AC voltage appears.

According to a further aspect, the present invention provides a method of supplying AC power for supplying AC power from a plurality of electric vehicles each capable of supplying AC power, to a power consuming unit. Each of the plurality of electric vehicles includes a rechargeable electric storage unit, an AC power generating unit receiving discharge power from the electric storage unit and generating AC power, and a supply line for electrically connecting the AC power generating unit to the power consuming unit. The AC power supplying method in accordance with this aspect includes the steps of: each of the plurality of electric vehicles detecting an AC voltage appearing on the supply line; and controlling the AC power generating unit such that, in the electric vehicle having the AC voltage appearing on the supply line, an AC current synchronized with the detected AC voltage is generated.

By the present invention, when an AC voltage appears on the supply line before generating the AC power, each electric vehicle controls the AC power generating unit such that an AC current synchronized with the detected AC voltage is generated. Therefore, even when AC power has already been supplied by a commercial power source or another electric vehicle to the power consuming unit, each electric vehicle can additionally be linked. Consequently, AC power can be supplied to the common power consuming unit in a cooperative manner, regardless of the number of electric vehicles.

Preferably, each of the plurality of electric vehicles further includes a communication unit capable of transmitting and receiving information to/from other electric vehicle(s). The method of supplying AC power in accordance with the present invention further includes the steps of: each of the plurality of electric vehicles transmitting identification data representing itself to the other electric vehicle(s) via the communication unit; each of the plurality of electric vehicles obtaining the identification data from the other electric vehicle(s) received via the communication unit; each of the plurality of electric vehicle(s) comparing the identification data of itself with the received identification data of other electric vehicles based on a predetermined determination rule; each of the plurality of electric vehicle(s) notifying to the other electric vehicles, when identification data of itself is the highest as compared with the identification data of other electric vehicle(s), that it is a master among the plurality of electric vehicles; and in the electric vehicle having no AC voltage appearing on the supply line, after notification to the other electric vehicle(s), controlling the AC power generating unit such that an AC voltage of a predetermined frequency is generated.

More preferably, the method of supplying AC power in accordance with the present invention is implemented by, in addition to the plurality of electric vehicles, a supply management unit for managing supply of AC power from the plurality of electric vehicles, and the communication unit is capable of receiving information from the supply management unit. The method of supplying AC power in accordance with the present invention further includes the steps of: the supply management unit issuing a supply start instruction to each of the plurality of electric vehicles in response to an external instruction; and after receiving the supply start instruction from the supply management unit, each of the plurality of electric vehicles starting supply of AC power.

Preferably, the method of supplying AC power according to the present invention is implemented by, in addition to the plurality of electric vehicles, a supply management unit for managing supply of AC power from the plurality of electric vehicles, and each of the plurality of electric vehicles further includes a communication unit capable of transmitting and receiving information to/from the supply management unit. The method of supplying AC power in accordance with the present invention includes the steps of: each of the plurality of electric vehicles transmitting identification data representing itself to the supply management unit via the communication unit; the supply management unit detecting an AC voltage supplied to the power consuming unit; the supply management unit obtaining the identification data transmitted from each of the plurality of electric vehicles; the supply management unit determining an electric vehicle of highest priority from the obtained identification data, based on a predetermined determination rule; the supply management unit applying, when no AC voltage is supplied to the power consuming unit, an instruction to start generation of a voltage reference to the determined electric vehicle; and in the electric vehicle receiving the generation start instruction from the supply management unit, controlling the AC power generating unit such that an AC voltage of a predetermined frequency is generated.

More preferably, the method further includes the steps of: the supply management unit applying the supply start instruction to each of the plurality of electric vehicles, in response to an external instruction; and after receiving the supply start instruction from the supply management unit, each of the plurality of electric vehicles starting supply of AC power.

By the present invention, it is possible to realize AC power supply from a plurality of electric vehicles each formed to allow supply of AC power to a common power consuming unit.

BEST MODES FOR CARRYING OUT THE INVENTION

Figure 1:
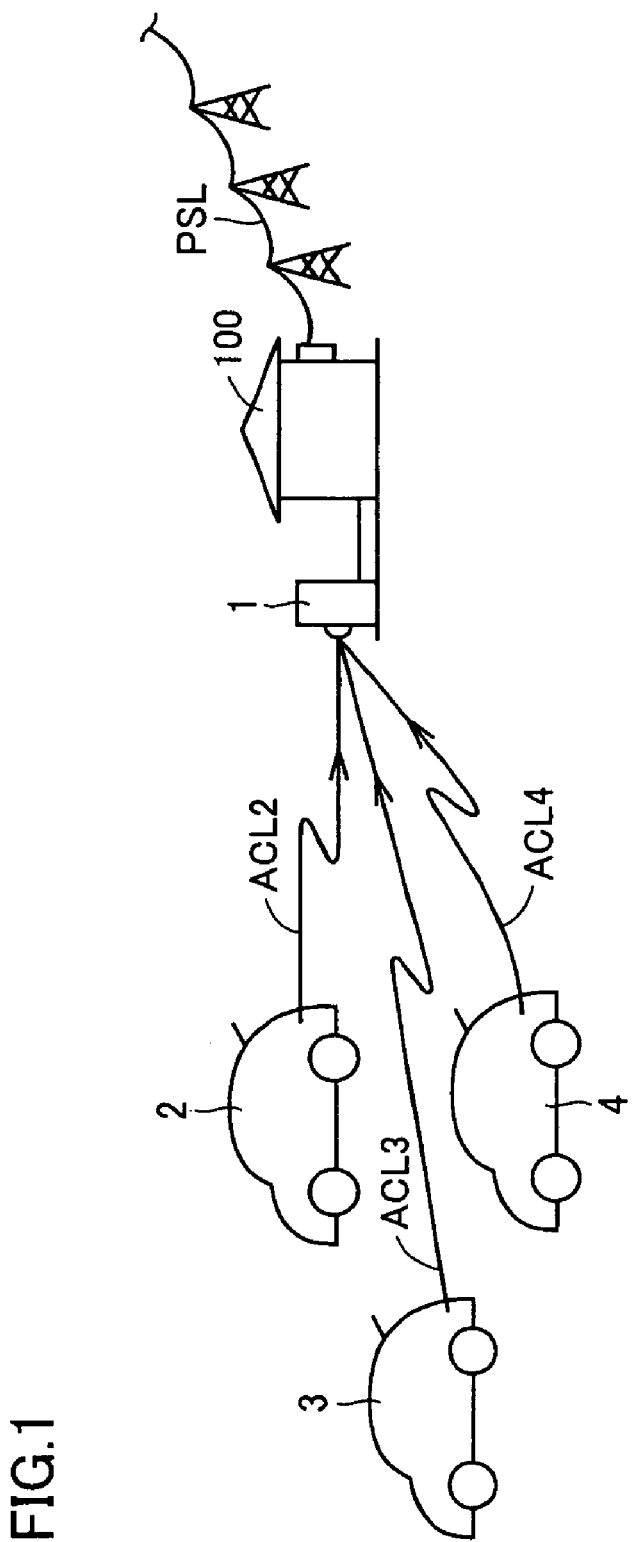
FIG. 1 shows a schematic configuration of the power system in accordance with an embodiment of the present invention.

Embodiments of the present invention will be described in detail with reference to the figures. In the figures, the same or corresponding portions will be denoted by the same reference characters and description thereof will not be repeated.

Referring to FIG. 1, in the power system in accordance with the present embodiment, electric vehicles 2, 3 and 4 (hereinafter simply referred to as a "vehicle") are electrically connected to a house 100 through supply lines ACL2, ACL3 and ACL4, respectively, to allow transfer of AC power to/from a power load (not shown) in the house 100. Further, a supply management system 1 is arranged between supply lines ACL2, ACL3, ACL4 and the house 100, to manage supply of AC power from vehicles 2, 3 and 4.

Further, the house 100 is formed to allow supply of AC power (commercial power supply) through an external power line PSL other than from the vehicles 2, 3 and 4.

Though a configuration in which three vehicles 2, 3 and 4 supply AC power to house 100 will be described as an example in the present embodiment, the present invention is applicable regardless of the number of vehicles.

In the following description, when vehicles 2, 3 and 4 are described not distinguished from each other, they will also be generally referred to as a "vehicle" and when supply lines ACL2, ACL3 and ACL4 are described not distinguished from each other, they will also be generally referred to as a "supply line ACL."

Figure 2A:
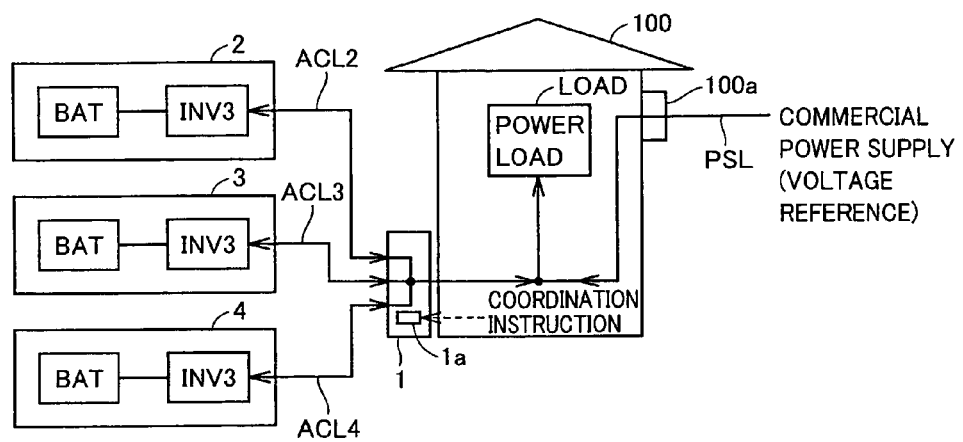
FIGS. 2A and 2B show in greater detail the configuration of power system in accordance with the embodiment shown in FIG. 1 of the present invention.
Figure 2B:
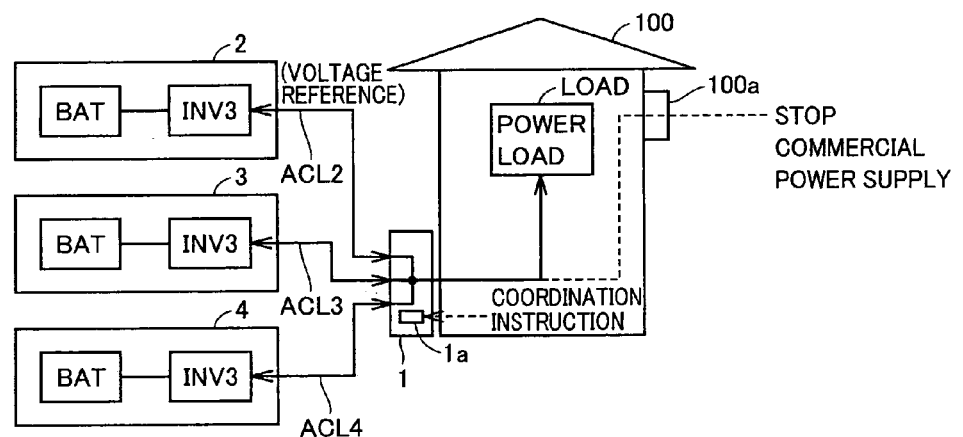

FIGS. 2A and 2B show more detailed configuration of the power system in accordance with the embodiment of the present invention shown in FIG. 1. FIG. 2A shows an example when commercial power is supplied to house 100. FIG. 2B shows an example when supply of commercial power to the house 100 is stopped.

Referring to FIG. 2A, a power load LOAD and a power receiving unit 100a are provided in the house 100. By way of example, power load LOAD represents illumination or electric appliance used in the house 100. Power receiving unit 100a represents a connecting member for taking in the external power line PSL, through which commercial power is supplied, to the house 100.

On the other hand, each of the vehicles 2, 3 and 4 includes a rechargeable electric storage unit BAT and an inverter INV3. Inverter INV3 is an AC power generating unit receiving electric power discharged from electric storage unit BAT and generating AC power.

Supply management device 1 is configured to allow attachment/detachment of supply lines ACL2, ACL3 and ACL4 of vehicles 2, 3 and 4, respectively. By way of example, a male connector is provided at one end of supply lines ACL2, ACL3 and ACL4, while a female connector fitting the male connector is provide at a side surface of supply management device 1. Supply management device 1 integrates supply lines ACL2, ACL3 and ACL4 to a common supply line, which is electrically connected to power load LOAD.

Further, supply management device 1 includes a communication control unit 1a. Communication control unit 1a is capable of receiving a coordination instruction from a user, and capable of transmitting/receiving information to/from vehicles 2, 3 and 4 through supply lines ACL2, ACL3 and ACL4, respectively. As will be described later, in the present embodiment, transmission/reception of information between each of the communication control unit 1a and vehicles 2, 3 and 4 is implemented by a power line communication (PLC, hereinafter also referred to as "PLC communication").

Communication control unit 1a applies a supply start instruction to each of vehicles 2, 3 and 4.

When commercial power is supplied to the house 100, AC power from the commercial power source and AC power from vehicle 2, 3 and 4 are supplied to power load LOAD. Here, each of the vehicles 2, 3 and 4 executes an operation of AC current generation, that is, control of inverter INV3, using the commercial power supply as a voltage reference.

Referring to FIG. 2B, when commercial power supply is stopped, power load LOAD receives only the AC power supply from vehicles 2, 3 and 4. Different from the example shown in FIG. 2A above, commercial power supply as a reference is not provided and, therefore, control of inverters INV3 is executed such that one of the vehicles 2, 3 and 4 (in the example of FIG. 2B, vehicle 2) generates AC power to be a voltage reference and other vehicles (in FIG. 2B, vehicles 3 and 4) are synchronized with the AC power generated by vehicle 2.

Figure 3:
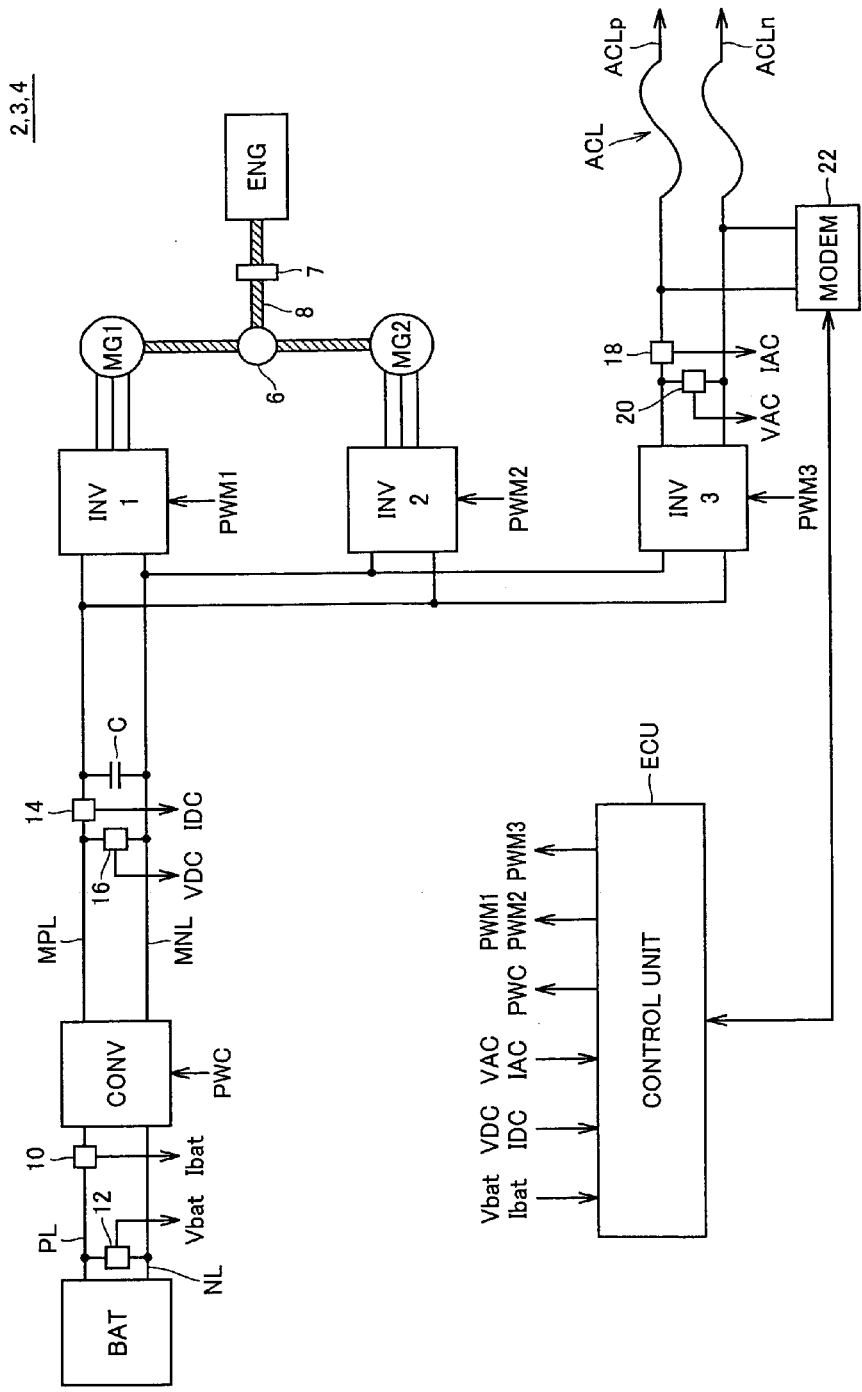
FIG. 3 schematically shows a configuration of each of the vehicles in accordance with the embodiment of the present invention.

FIG. 3 schematically shows a configuration of each of the vehicles 2, 3 and 4 in accordance with the embodiment of the present invention. The present invention is applicable to any vehicle that includes a rechargeable electric storage unit. As an example, a configuration in which vehicles 2, 3 and 4 are all implemented by hybrid vehicles will be described.

Referring to FIG. 3, each of the vehicles 2, 3 and 4 further includes a controller ECU, an electric storage unit BAT, a converter CONV, inverters INV1 and INV2, motor generators MG1 and MG2, an engine ENG, and a modem 22.

Electric storage unit BAT is configured to allow charging/discharging by the converter CONV. By way of example, a lithium ion or a nickel hydride secondary battery, or an electric storage such as an electric double layer capacitor may be used as electric storage unit BAT.

Converter CONV is electrically connected to electric storage unit BAT through a positive power line PL and a negative power line NL, and connected to inverters INV1, INV2 and INV3 through main positive power line MPL and a main negative power line MNL. Converter CONV performs a voltage converting operation (voltage lowering operation or boosting operation) between electric storage unit BAT and main positive and negative lines MPL and MNL, and thereby controls charging/discharging of electric storage unit BAT. Specifically, when electric storage unit BAT is to be charged, converter CONV lowers the voltage between main positive and negative power lines MPL and MNL, and supplies charging current to electric storage unit BAT. When electric storage unit BAT is to be discharged, converter CONV boosts the discharging voltage of electric storage unit BAT, and supplies discharge current to inverters INV1, INV2 and INV3, through main positive and negative power lines MPL and MNL.

A battery current detecting unit 10 inserted to positive power line PL detects the charge/discharge current Ibat of electric storage unit BAT, and outputs the detected value to control unit ECU. Further, a battery voltage detecting unit 12 connected between positive power line PL and negative power line NL detects an output voltage Vbat of electric storage unit BAT, and outputs the detected value to control unit ECU.

Inverters INV1 and INV2 are connected in parallel to main positive power line MPL and main negative power line MNL, and transfer electric power to/from electric storage unit BAT through converter CONV. Specifically, inverters INV1 and INV2 are adapted to be capable of converting DC power applied through main positive power line MPL and main negative power line MNL to AC power and thereby driving motor generators MG1 and MG2, respectively. Further, at the time of regenerative braking of the vehicle, for example, inverters INV1 and INV2 are capable of converting the AC power generated by motor generators MG1 and MG2 and returning the power to electric storage unit BAT. By way of example, inverters INV1 and INV2 are formed of a bridge circuit including three-phase switching elements and, by performing a switching operation (opening/closing circuit) in response to switching commands PWM1 and PWM2 received from control unit ECU, generate three-phase AC power, respectively.

A supply current detecting unit 14 inserted to main positive power line MPL detects main line current IDC flowing between converter CONV and inverters INV1, INV2 and INV3, and outputs the detected value to control unit ECU. Further, a main line voltage detecting unit 16 connected between main positive power line MPL and main negative power line MNL detects a main line voltage VDC, and outputs the result of detection to control unit ECU. Further, between main positive power line MPL and main negative power line MNL, a smoothing capacitor C is connected, which reduces fluctuation component (AC component) involved in the electric power flowing between the converter CONV and inverters INV1, INV2 and INV3.

Motor generators MG1 and MG2 are capable of generating rotation driving force, by receiving AC power supplied from inverters INV1 and INV2, respectively, and capable of generating AC power, by receiving rotation driving force from engine ENG. By way of example, motor generators MG1 and MG2 are each three-phase AC rotating electric machine including a rotor with embedded permanent magnet. Output shafts of motor generators MG1 and MG2 are mechanically coupled to engine ENG, via a power split device 6 and a driving shaft 8.

Engine ENG is an internal combustion engine that operates on combustion of fossil fuel such as gasoline. The driving force generated by the engine ENG may be transmitted to wheels (not shown) via a power transmitting unit 7 provided on driving shaft 8, together with the driving force from motor generators MG1 and MG2. At this time, control unit ECU executes control such that the driving force generated by the engine and the driving force generated by motor generators attain an optimal ratio.

Inverter INV3 is connected in parallel with inverters INV1 and INV2 to main positive line MPL and main negative line MNL, receives a discharge power (DC power) from electric storage unit BAT supplied through converter CONV, and generates AC power to be supplied to power load LOAD (FIGS. 2A and 2B). By way of example, inverter INV3 is implemented by a single-phase inverter, to be adaptable to the electric power used in household 100. Inverter INV3 transfers generated AC electric power to/from the power load LOAD, through supply line ACL (positive supply line ACLp and negative supply line ACLn).

Supply current detecting unit 18 inserted to positive power line ACLp detects supply current IAC to power load LOAD, and outputs the detected value to control unit ECU. Further, supply voltage detecting unit 20 connected between positive supply line ACLp and negative supply line ACLn detects supply voltage VAC to power load LOAD, and outputs the detected value to control unit ECU.

Modem 22 is configured to allow transmission/reception of information to/from other vehicles and supply management device 1 (FIGS. 1, 2A and 2B). Specifically, modem 22 is connected to positive supply line ACLp and negative supply line ACLn, and implements transmission/reception of information by PLC communication through supply lines ACL.

Control unit ECU controls inverter INV3 so that AC power can be supplied to power load LOAD (FIGS. 2A, 2B) in a coordinated manner with other vehicles. Specifically, first, control unit ECU determines whether or not a supply start instruction is to be received from supply management device 1 by modem 22. Receiving the supply start instruction, control unit ECU transmits an identification ID indicating itself to the other vehicles through modem 22, in order to recognize vehicles electrically connected to common power load LOAD with each other. Similarly, identification IDs representing other vehicles are transmitted from the other vehicles and, therefore, control unit ECU obtains the identification IDs from other vehicles received by modem 22. Identification ID includes, by way of example, model information, capacity of electric storage BAT and capacity of inverter INV3.

In accordance with a predetermined determination rule, if the identification ID of itself has the highest priority as compared with the identification IDs of other vehicles, control unit ECU notifies to the other vehicles that it is the master among the plurality of vehicles electrically connected to the common power load LOAD. In the following description, the vehicle that issued the master notification will also be referred to as a "master vehicle" and vehicle(s) other than the master vehicle will also be referred to as "slave vehicle(s)."

The determination rule used in control unit ECU of each vehicle is common to each other and, therefore, the result of determination by control unit ECU of each vehicle is the same. Therefore, regardless of the number of vehicles electrically connected to power load LOAD, there will be only one master vehicle.

As as example of determination rule, the priority may be determined using the capability of supplying AC power as a parameter. Specifically, based on model information or the like included in identification ID, the vehicle that has the inverter IV3 of largest capacity may be determined to be the vehicle of highest priority. Naturally, determination may be made using other method.

Thereafter, based on the supply voltage VAC from supply voltage detecting unit 20, control unit ECU detects the AC voltage (voltage reference) appearing on supply line ACL. As shown in FIG. 2A, while the commercial power is supplied to power load LOAD, an AC voltage corresponding to the commercial power source appears on the supply line ACL that is electrically connected to external power line PSL. Therefore, it is necessary to control inverter INV3 to be coordinated with the commercial power supply. Therefore, control unit ECU controls inverter INV3 such that, when an AC voltage appears on supply line ACL, an AC current synchronized with the detected AC voltage is generated. Specifically, control unit ECU controls inverter INV3 using the AC voltage detected by supply voltage detecting unit 20 as a voltage reference.

Here, control unit ECU executes a current control mode in which the AC current is regulated to attain a prescribed target value. This current control mode enables coordination with the other vehicle or vehicles and realizes control of the amount of AC power supplied from inverter INV3.

On the other hand, when supply of commercial power is stopped as shown in FIG. 2B, no AC voltage appears on supply line ACL electrically connected to external power line PSL. Therefore, it is necessary to generate a voltage reference to realize coordination of the vehicles. When AC voltage does not appear on supply line ACL, control unit ECU of the master vehicle generates AC voltage of a predetermined frequency, by controlling inverter INV3. Specifically, the control unit ECU of master vehicle executes a voltage control mode in accordance with the frequency of an oscillator provided therein, whereby the AC voltage generated by itself is set as the voltage reference for the other vehicles. Further, when the master vehicle starts generation of AC voltage, each control unit ECU of the slave vehicle starts control of inverter INV3 such that synchronization with the AC voltage appearing on supply line ACL is attained.

In this manner, the plurality of vehicles start supply of AC power to power load LOAD in a coordinated manner. Thereafter, control unit ECU of a slave vehicle transmits state values such as the amount of power generated by inverter INV3 and the state of charge (SOC) of electric storage BAT, at every prescribed period. The control unit ECU of master vehicle applies a control instruction to each slave vehicle to generate a prescribed target amount of power.

In the embodiment of the present invention, power load LOAD corresponds to the "power consumption unit," inverter INV3 corresponds to the "AC power generating unit," and modem 22 corresponds to the "communication unit." Further, control unit ECU implements the "first AC voltage detecting means," the "first control means," the "second control means," the "transmission means" and the "master notification means."

(Overall Sequence of Power System when Commercial Power is Supplied)

Figure 4:
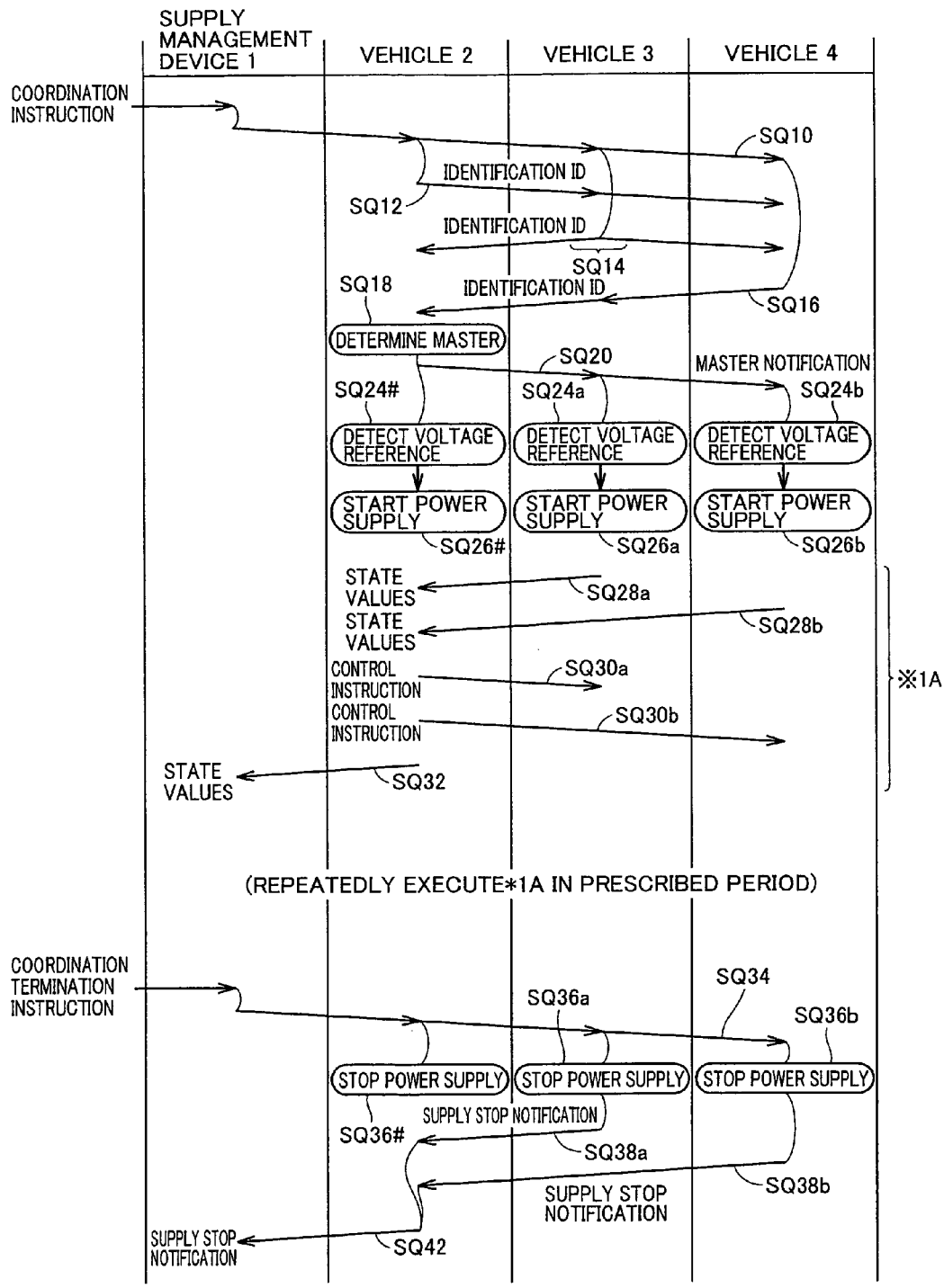
FIG. 4 shows an overall sequence of the power system in accordance with the embodiment of the present invention, when commercial power is supplied to a house.

Referring to FIG. 4, an overall sequence of the power system in accordance with the present embodiment, when commercial power is supplied to house 100, will be described. In FIG. 4, an example will be described in which vehicle 2 is the master vehicle.

Supply management device 1 applies a supply start instruction to each of the vehicles 2, 3 and 4 in response to a coordination instruction from a user (sequence SQ10). Receiving the supply start instruction, vehicle 2 transmits an identification ID representing itself to vehicles 3 and 4 (sequence SQ12). Similarly, vehicle 3 transmits the identification ID of itself to vehicles 2 and 4 (sequence SQ14), and vehicle 4 transmits the identification ID of itself to vehicles 2 and 3 (sequence SQ16).

Each of the vehicles 2, 3 and 4 determines, based on the predetermined determination rule, whether the identification ID of itself has higher priority than the identification IDs of other vehicles. In the example of FIG. 4, identification ID of vehicle 2 has the highest priority and, therefore, vehicle 2 determines that it is the master (sequence SQ18). Then, vehicle 2 issues a master notification to vehicles 3 and 4, notifying that vehicle 2 is the master among vehicles 2, 3 and 4 (sequence SQ20).

Thereafter, vehicle 2 as the master vehicle determines whether or not an AC voltage (voltage reference) is detected by supply voltage detecting unit 20. In the example of FIG. 4, an AC voltage corresponding to the commercial power supply appears on supply line ACL and, therefore, vehicle 2 detects the AC voltage as the voltage reference (sequence SQ24#). Then, vehicle 2 controls inverter INV3 such that an AC current synchronized with the detected voltage reference is generated, and starts power supply (sequence SQ26#).

Vehicle 3 as a slave vehicle also detects, by supply voltage detecting unit 20, the AC voltage as the voltage reference (sequence SQ24a). Then, vehicle 3 controls inverter INV3 such that an AC current synchronized with the detected voltage reference is generated, and starts power supply (sequence SQ26a). Similarly, vehicle 4 as a slave vehicle also detects, by supply voltage detecting unit 20, the AC voltage as the voltage reference (sequence SQ24b). Then, vehicle 3 controls inverter INV3 such that an AC current synchronized with the detected voltage reference is generated, and starts power supply (sequence SQ26b).

After the start of power supply by each of the vehicles 2, 3 and 4, each of the vehicles 3 and 4 as slave vehicles transmits the state values of itself to vehicle 2 as the master vehicle (sequences SQ28a and SQ28b). Then, based on the state values received from vehicles 3 and 4, vehicle 2 transmits control instructions instructing target amount of power and the like to vehicles 3 and 4 (sequences SQ30a and SQ30b). Further, vehicle 2 transmits, in addition to the state values of itself, state values received from vehicles 3 and 4, to supply management device 1 (sequence SQ32). By way of example, supply management device 1 displays the state of power supply of vehicles 2, 3 and 4 on a display device (not shown) arranged in house 100, in accordance with the state values received from vehicle 2.

Thereafter, sequences SQ28a and 28b, SQ30a and 30b, and sequence SQ32 are repeated.

Receiving a coordination termination instruction from a user, for example, supply management unit 1 applies a supply end instruction to each of the vehicles 2, 3 and 4 (sequence SQ34). Receiving the supply end instruction, each of the vehicles 2, 3 and 4 stops the AC power generating operation of inverter INV3, and stops power supply (sequences SQ36#, SQ36a and SQ36b).

Thereafter, each of the vehicles 3 and 4 as slave vehicles notifies vehicle 2 as the master vehicle that the power supply is stopped (sequences SQ38a and SQ38b). Vehicle 2 transmits the notification of supply stop received from vehicles 3 and 4, in addition to the stop of power supply of itself, to supply management device 1 (sequence SQ42).

In this manner, power supply to power load LOAD by vehicles 2, 3 and 4 is stopped.

(Overall Sequence of Power System when Supply of Commercial Power is Stopped)

Figure 5:
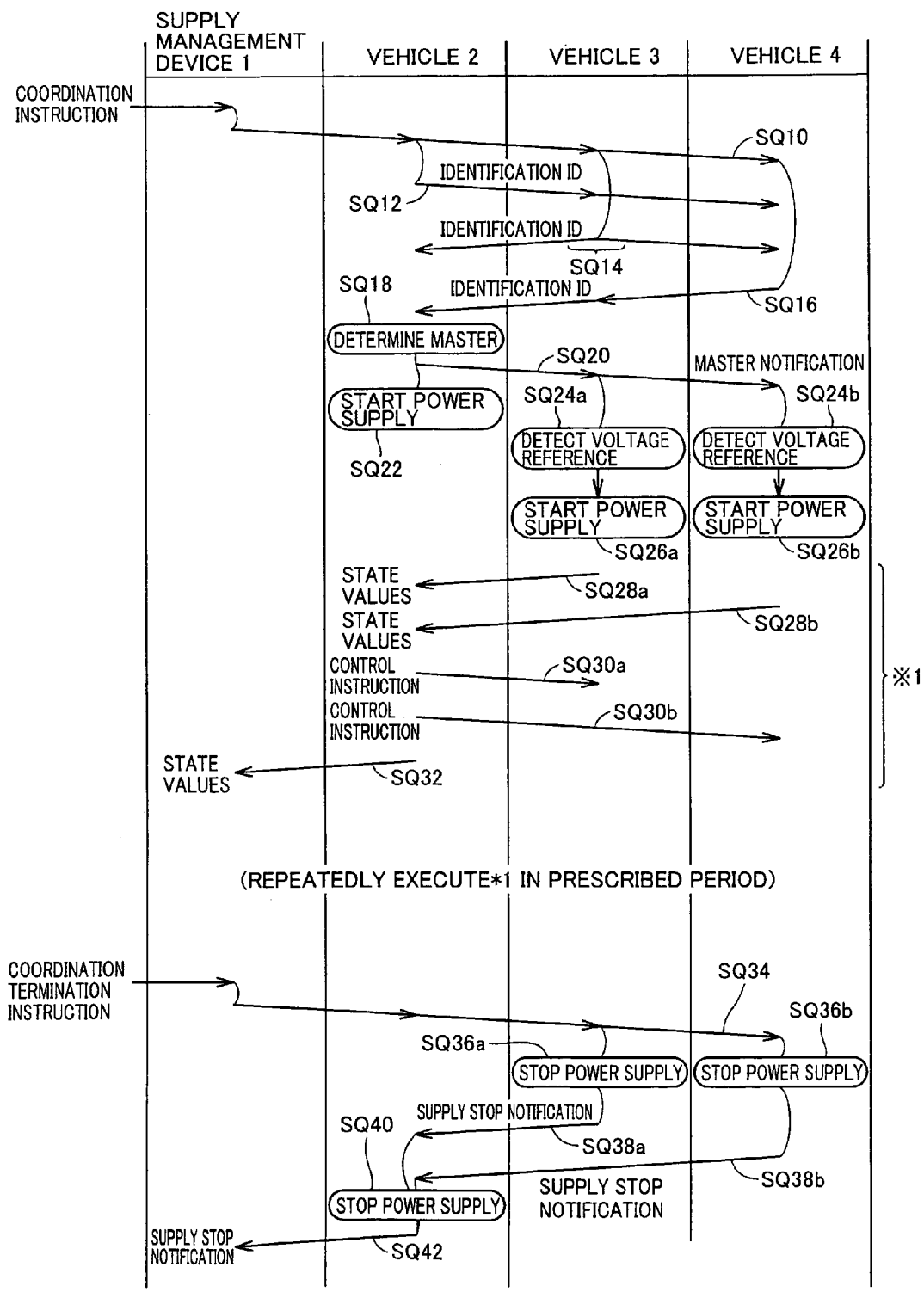
FIG. 5 shows an overall sequence of the power system in accordance with the embodiment of the present invention, when commercial power supply to the house is stopped.

Referring to FIG. 5, an overall sequence of the power system in accordance with the present embodiment when commercial power supply to house 100 is stopped, will be described. In FIG. 5 also, an example will be described in which vehicle 2 is the master vehicle.

Supply management device 1 applies a supply start instruction to each of the vehicles 2, 3 and 4 in response to a coordination instruction from a user (sequence SQ10). Receiving the supply start instruction, vehicle 2 transmits an identification ID representing itself to vehicles 3 and 4 (sequence SQ12). Similarly, vehicle 3 transmits the identification ID of itself to vehicles 2 and 4 (sequence SQ14), and vehicle 4 transmits the identification ID of itself to vehicles 2 and 3 (sequence SQ16).

Each of the vehicles 2, 3 and 4 determines, based on the predetermined determination rule, whether the identification ID of itself has higher priority than the identification IDs of other vehicles. In the example of FIG. 4, identification ID of vehicle 2 has the highest priority and, therefore, vehicle 2 determines that it is the master (sequence SQ18). Then, vehicle 2 issues a master notification to vehicles 3 and 4, notifying that vehicle 2 is the master among vehicles 2, 3 and 4 (sequence SQ20).

Thereafter, vehicle 2 as the master vehicle determines whether or not an AC voltage (voltage reference) is detected by supply voltage detecting unit 20. In the example of FIG. 5, no AC voltage appears on supply line ACL and, therefore, vehicle 2 controls inverter INV3 such that generation of an AC voltage of a predetermined frequency starts (sequence SQ22). Specifically, the master vehicle sets the AC voltage of itself as the voltage reference for other vehicles.

Vehicle 3 as a slave vehicle detects, by supply voltage detecting unit 20, the AC voltage generated by vehicle 2 as the voltage reference (sequence SQ24a). Then, vehicle 3 controls inverter INV3 such that an AC current synchronized with the detected voltage reference is generated, and starts power supply (sequence SQ26a). Similarly, vehicle 4 as a slave vehicle also detects, by supply voltage detecting unit 20, the AC voltage generated by vehicle 2 as the voltage reference (sequence SQ24b). Then, vehicle 4 controls inverter INV3 such that an AC current synchronized with the detected voltage reference is generated, and starts power supply (sequence SQ26b).

Sequences SQ28a, SQ28b, SQ30a, SQ30b and SQ32 after the start of power supply by each of vehicles 2, 3 and 4 are the same as those shown in FIG. 4 and, therefore, detailed description will not be repeated.

Receiving a coordination termination instruction from a user, for example, supply management unit 1 applies a supply end instruction to each of the vehicles 2, 3 and 4 (sequence SQ34). Different from FIG. 4, vehicle 2 generates the AC voltage as the voltage reference and, therefore, vehicle 2 continues power supply even when the supply end instruction is received. On the other hand, each of the vehicles 3 and 4 stops the AC power generating operation of inverter INV3 in response to the supply end instruction, and stops power supply (sequences SQ36a and SQ36b).

Thereafter, each of the vehicles 3 and 4 as slave vehicles notifies vehicles 2 as the master vehicle that the power supply is stopped (sequences SQ38a and SQ38b). Receiving the notification of supply stop from vehicles 3 and 4, vehicle 2 stops power supply of itself (sequence SQ40). Then, vehicle 2 transmits the notification of supply stop received from vehicles 3 and 4, in addition to the stop of power supply of itself, to supply management device 1 (sequence SQ42).

In this manner, power supply to power load LOAD by vehicles 2, 3 and 4 is stopped.

(Control Structure)

Figure 6:
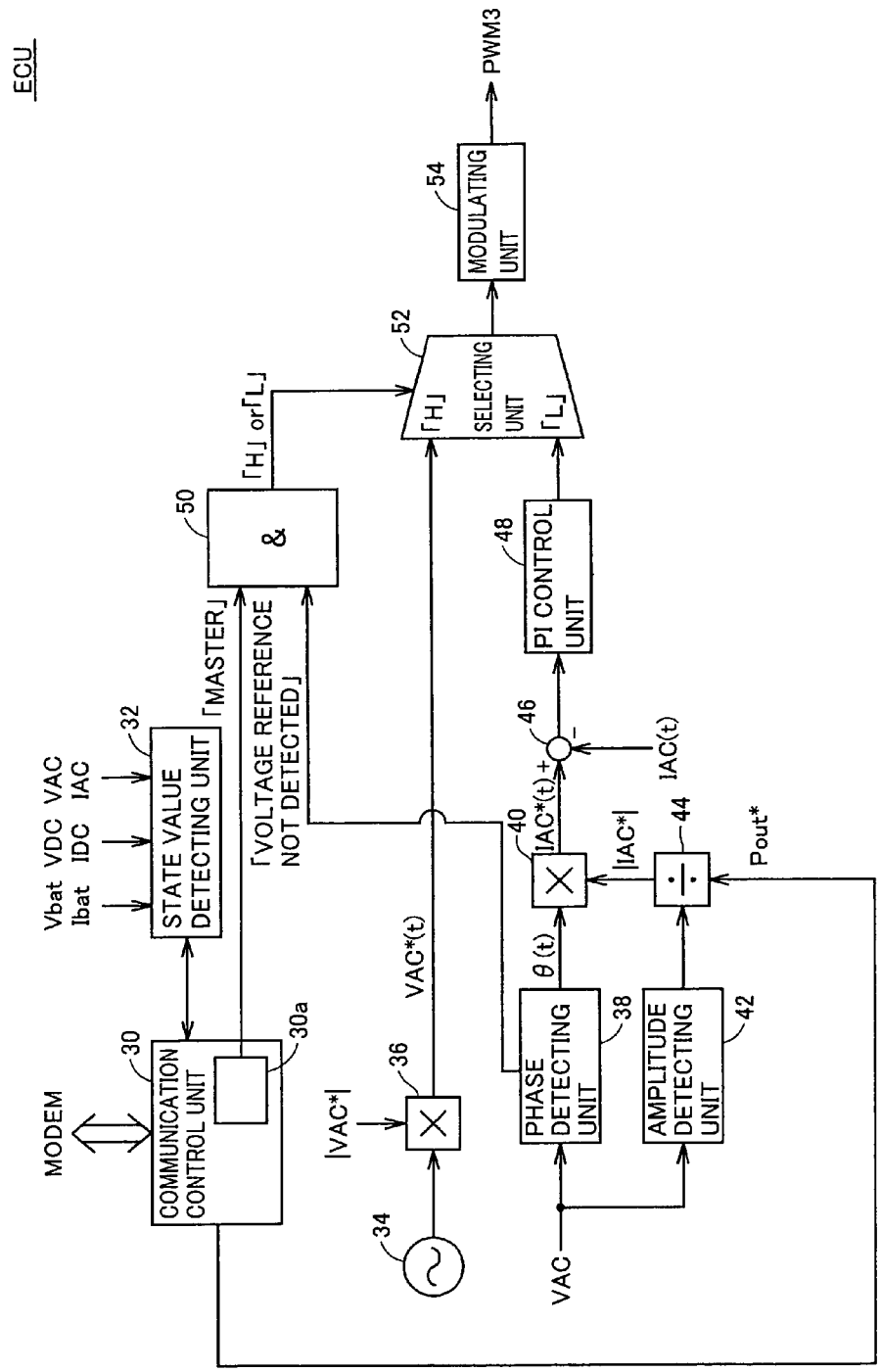
FIG. 6 is a block diagram showing a control structure of a controller in each vehicle, in accordance with the embodiment of the present invention.

Referring to FIG. 6, the control structure of control unit ECU of vehicles 2, 3 and 4 includes a communication control unit 30, a state value detecting unit 32, a reference oscillation unit 34, multiplying units 36 and 40, a phase detecting unit 38, an amplitude detecting unit 42, a dividing unit 44, a subtracting unit 46, a PI control unit 48, a logical product unit 50, a selecting unit 52, and a modulating unit 54.

Communication control unit 30 serves as an interface to modem 22 (FIG. 3), and processes pieces of information transmitted/received between supply management device 1 and other vehicles. Specifically, receiving the supply start instruction from supply management device 1 via modem 22, communication control unit 30 transmits the identification ID of itself to the other vehicles via modem 22.

Further, communication control unit 30 includes a determination rule determining unit 30a. Determination rule determining unit 30a determines whether or not the identification ID of itself has the highest priority as compared with the identification ID(s) of other vehicle(s), and determines whether it is the "master" or not. If it is determined to be the "master", determination rule determining unit 30a transmits the result of determination to logical product unit 50.

Further, communication unit 30 is connected to state value detecting unit 32, which will be described later. If it is the master vehicle, communication control unit 30 determines, based on the state values of itself output from state value detecting unit 32 and on the state values of other vehicles received via modem 22, a target amount of power Pout* to be shared by each vehicle, and outputs it as a control instruction to other vehicles. If it is a slave vehicle, communication control unit 30 transmits the state values of itself output from state value detecting unit 32 to the master vehicle, receives the target amount of power Pout* from the master vehicle via modem 22 and outputs it to dividing unit 44.

State value detecting unit 32 obtains state values such as the amount of power generated by inverter INV3 and state of charge (SOC) of electric storage BAT, based on charging/discharging current That and output voltage Vbat of electric storage BAT, main line voltage VDC, main line current IDC, supply voltage VAC and supply current IAC, and outputs the values to communication control unit 30.

Reference oscillation unit 34 and multiplying unit 36 are functional blocks for the vehicle set to be the master for generating the voltage reference, when the supply of commercial power is stopped.

Reference oscillation unit 34 generates a reference period signal having substantially the same period (for example, 60 Hz or 50 Hz) as the commercial power supply. Reference oscillation unit 34 outputs the generated reference period signal to multiplying unit 36.

Multiplying unit 36 multiplies a predetermined target supply voltage |VAC*| (amplitude value) by the reference period signal received from reference oscillation unit 34, and outputs the resulting target supply voltage VAC*(t) to selecting unit 52.

Phase detecting unit 38, multiplying unit 40, amplitude detecting unit 42, dividing unit 44, subtracting unit 46 and PI control unit 48 are blocks for generating the AC current synchronized with an externally supplied voltage reference, when the commercial power is supplied, or when the vehicle is a slave vehicle.

Phase detecting unit 38 receives the supply voltage VAC and determines whether or not an AC voltage to be the voltage reference is detected. Specifically, based on whether the supply voltage VAC has its amplitude changed with time by at least a prescribed threshold value or not, phase detecting unit 38 determines whether the AC voltage is detected or not.

When the AC voltage as the voltage reference is detected, phase detecting unit 38 extracts phase information θ(t) of the voltage reference. If the AC voltage as the voltage reference cannot be detected, phase detecting unit 38 outputs information that the voltage reference is not detected, to logical product unit 50. Phase detecting unit 38 outputs the phase information θ(t) extracted from supply voltage VAC as the voltage reference to multiplying unit 40.

Receiving the supply voltage VAC, amplitude detecting unit 42 detects the voltage amplitude of supply voltage VAC, and outputs it to dividing unit 44.

Dividing unit 44 calculates, based on the result of division of target amount of power Pout* applied from communication control unit 30 by the voltage amplitude of supply voltage VAC, a target supply current |IAC*| (amplitude), and outputs it to dividing unit 44.

Multiplying unit 40 multiplies the target supply current |IAC*| received from dividing unit 44 by the phase information θ(t) received from phase detecting unit 38, and calculates a target supply current IAC*(t).

Subtracting unit 46 and PI control unit 48 are feedback control blocks to have supply current IAC matched with the target supply current IAC*(t). Subtracting unit 46 calculates a deviation between the target supply current IAC*(t) and supply current IAC, and outputs it to PI control unit 48.

PI control unit 48 is formed to include at least a proportional element (P) and an integral element (I), and outputs a control output in accordance with the deviation output from subtracting unit 46 to selecting unit 52 with prescribed gain and time constant.

When the "master" information is received from communication control unit 30 and the information that "voltage reference is not detected" is received from phase detecting unit 38, logical product unit 50 outputs a selection signal of logic "H" to selecting unit 52.

In the period in which the selection signal of logic "H" is received from logical product unit 50, selecting unit 52 provides an input that corresponds to the logic "H", that is, the target supply voltage VAC*(t), to modulating unit 54. In the period in which the selection signal of logic "H" is not received from logical product unit 50, selecting unit 52 provides an input that corresponds to the logic "L", that is, the control output from PI control unit 48, to modulating unit 54.

Modulating unit 54 compares a carrier wave generated by an oscillating unit, not shown, with the output signal from selecting unit 52, and generates a switching command PWM3 for controlling the operation of generating AC power of inverter INV3.

(Synchronization with Voltage Reference)

Figure 7A:
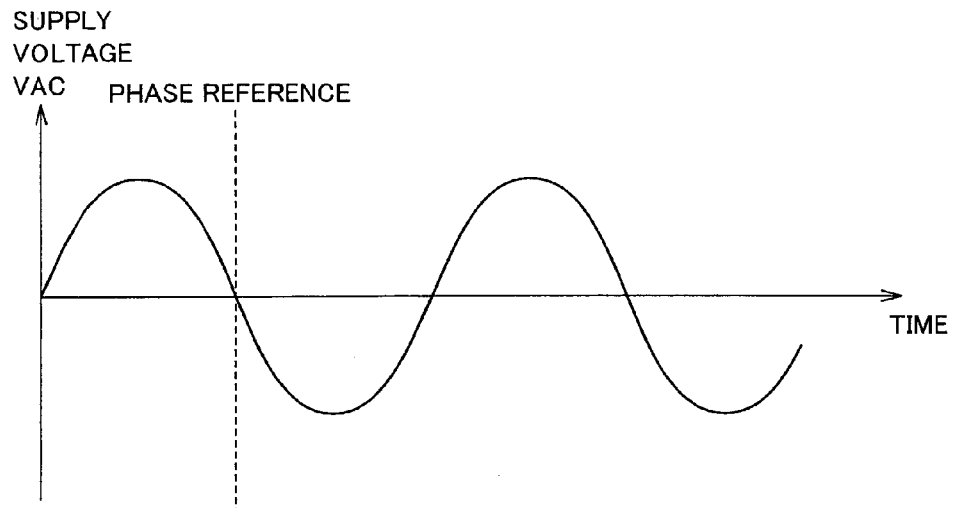
FIGS. 7A and 7B schematically illustrate generation of AC current in synchronization with a voltage reference.
Figure 7B:
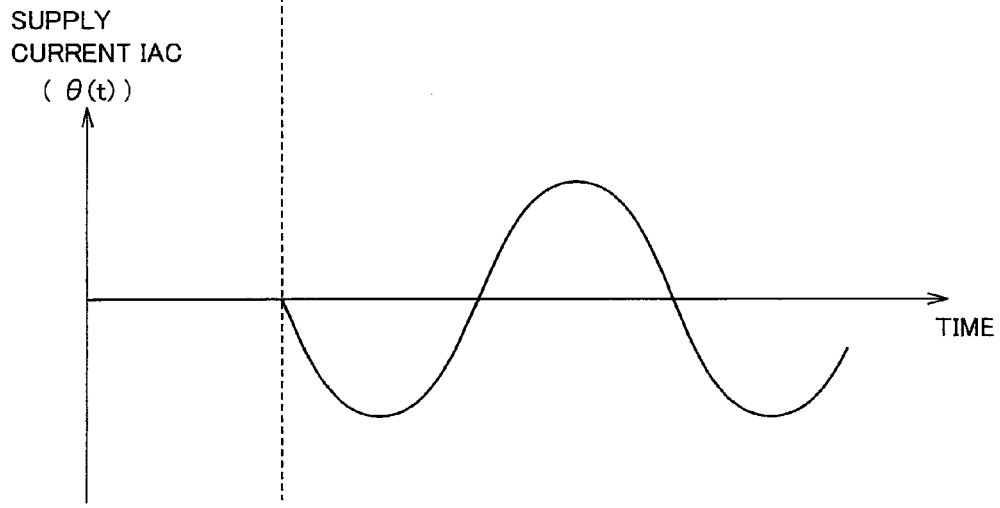

Referring to FIGS. 7A and 7B, outline of generation of AC current synchronized with the voltage reference will be described. FIG. 7A shows waveform with time of supply voltage VAC (voltage reference). FIG. 7B shows waveform with time of supply current IAC output in synchronization with supply voltage VAC.

Referring to FIG. 7A, phase detecting unit 38 (FIG. 6) obtains phase information θ(t) to attain synchronization with the AC voltage, based on the timing of a zero-cross point of supply voltage VAC detected by supply voltage detecting unit 20 (FIG. 3).

Referring to FIG. 7B, phase detecting unit 38 starts output of phase information θ(t) after the timing of zero-cross of supply voltage VAC. Subtracting unit 46 and PI control unit 48 (FIG. 6) control inverter INV3 such that supply current IAC matches the target supply current IAC*(t) calculated from phase information θ(t). Therefore, synchronized supply current IAC is also output from the timing of zero-cross of supply voltage VAC.

(Flowchart)

Figure 8:
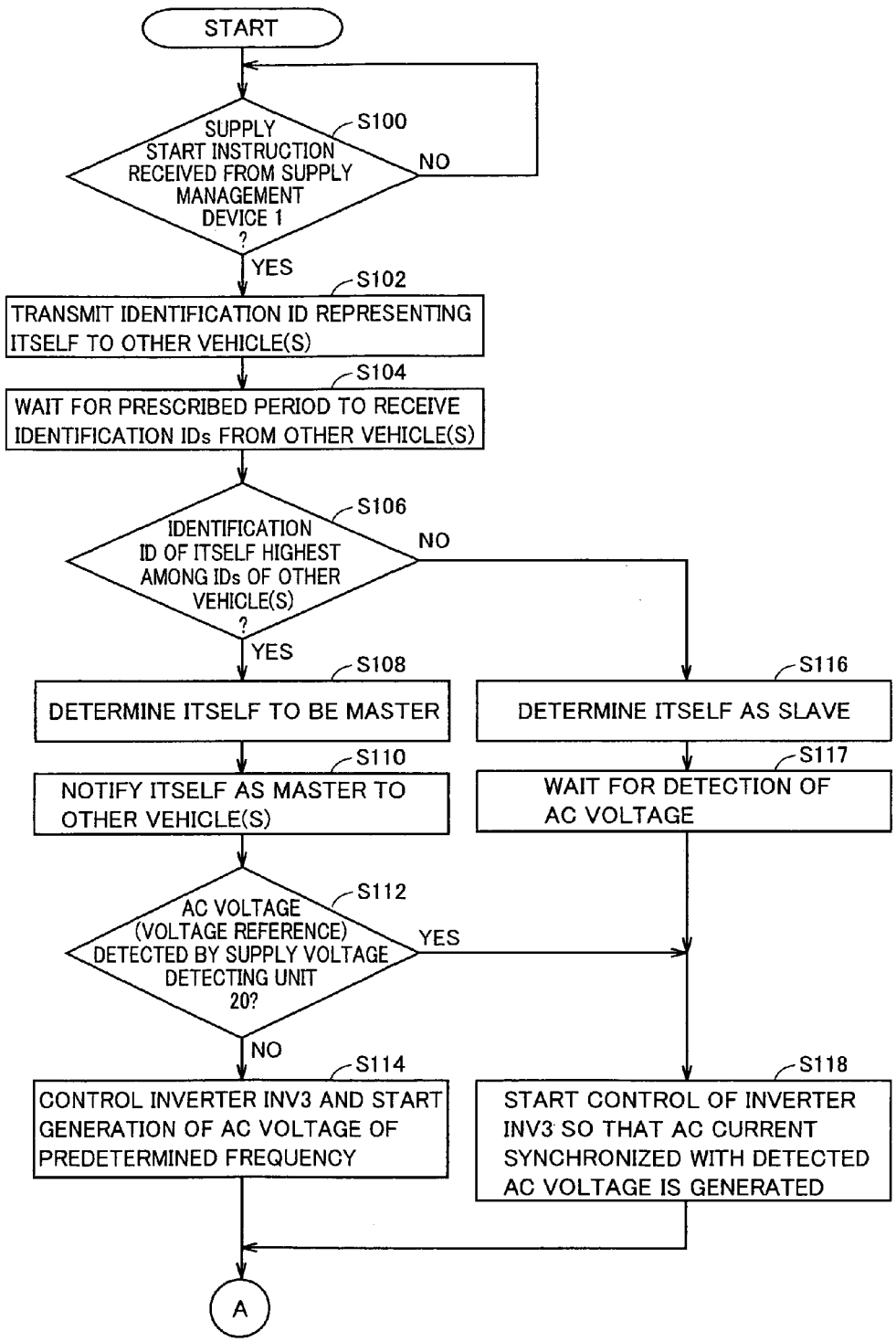
FIG. 8 is a flowchart representing process steps related to the start of power supply in each vehicle in accordance with the embodiment of the present invention.

Referring to FIG. 8, process steps related to the start of power supply in each of the vehicles in accordance with the present embodiment will be described.

Control unit ECU of each vehicle determines whether the supply start instruction has been received from supply management device 1 via modem 22 (step S100). If the supply start instruction has not been received (NO at step S100), control unit ECU waits for the reception of supply start instruction.

If the supply start instruction has been received (YES at step S100), control unit ECU transmits the identification ID representing itself to the other vehicle(s) via modem 22 (step S102). Then, control unit ECU waits for a prescribed time period to receive the identification IDs from other vehicle(s) (step S104). Control unit ECU then compares the identification ID of itself with the received identification IDs of other vehicle(s), and determines whether the identification ID of itself has the highest priority as compared with the identification IDs of other vehicle(s) (step S106).

If the identification ID of itself has the highest priority as compared with the identification IDs of other vehicle(s) (YES at step S106), control unit ECU determines itself to be the master (step S108). Then, control unit ECU notifies to the other vehicle(s) that it is the master (step S110). Thereafter, control unit ECU determines whether or not the AC voltage (voltage reference) is detected by supply voltage detecting unit 20 (step S112). If the AC voltage is not detected by supply voltage detecting unit 20 (NO at step S112), control unit ECU control inverter INV3 so that generation of an AC voltage of predetermined frequency starts (step S114).

If the identification ID of itself has lower priority than the identification IDs of other vehicle(s) (NO at step S106), control unit ECU determines itself to be the slave, after receiving a master notification from the master vehicle (step S116). Thereafter, control unit ECU waits for detection of the AC voltage by supply voltage detecting unit 20 (step S117).

If the AC voltage is detected by supply voltage detecting unit 20 (YES at step S112 or after step S117), control unit ECU starts control of inverter INV3 such that an AC current synchronized with the AC voltage detected by supply voltage detecting unit 20 is generated (step S118).

Figure 9:
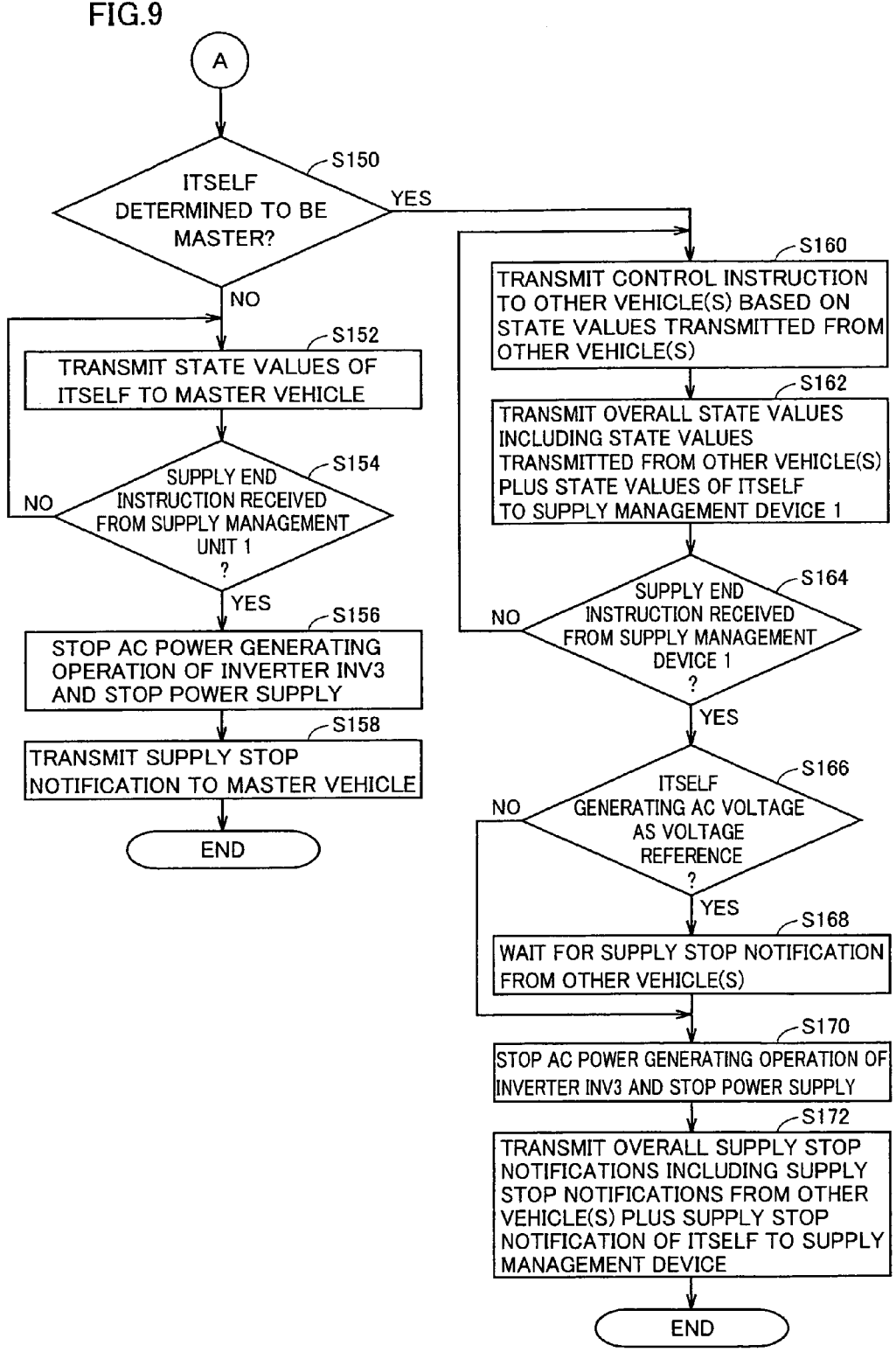
FIG. 9 is a flowchart representing process steps during execution and at the end of power supply in each vehicle in accordance with the embodiment of the present invention.

When power supply to power load LOAD starts through the above-described steps, control unit ECU of each vehicle proceeds to the process flow shown in FIG. 9.

Referring to FIG. 9, first, control unit ECU determines whether or not it is determined to be the master (step S150).

If it is determined to be a slave (NO at step S150), control unit ECU transmits state values of itself to the master vehicle (step S152). Then, control unit ECU determines whether a supply end instruction has been received via modem 22 or not (step S154). If the supply end instruction has not yet been received (NO at step S154), control unit ECU repeatedly executes steps S152 and S154 described above. If the supply end instruction has been received (YES at S154), control unit ECU stops the operation of generating AC power of inverter INV3, and stops power supply (step S158). Further, control unit ECU transmits notification of supply stop to the master vehicle (step S158), and the process ends.

If it is determined to be the master (YES at step S150), control unit ECU transmits the control instruction to other vehicle(s), based on state values transmitted from the other vehicle(s) (step S160). Further, control unit ECU transmits the overall state values including the state values of itself in addition to the state values transmitted from the other vehicle(s), to supply management device 1 (step S162). Further, control unit ECU determines whether a supply end instruction has been received from supply management device 1 via modem 22 or not (step S164). If the supply end instruction has not been received (NO at step S164), control unit ECU repeatedly executes steps S160 to S164 described above. If the supply end instruction is received (YES at step S164), control unit ECU determines whether it is generating an AC voltage to be the voltage reference or not (step S166).

If it is generating the AC voltage to be the voltage reference (YES at step S166), control unit ECU waits for reception of the supply stop notification from the other vehicle(s) (step S168). If the stop notification is received from all the other vehicle(s), the operation of generating AC power of inverter INV3 is stopped, and thus, power supply is stopped (step S170).

If it is not generating the AC voltage to be the voltage reference (NO at step S166), control unit ECU stops the operation of generating AC power of inverter INV3 without waiting for the stop notification transmitted from other vehicle(s), and stops power supply (step S170).

After the stop of power supply (after step S170), control unit ECU transmits the overall state values including the state values of itself in addition to the state values transmitted from the other vehicle(s), to supply management device 1 (step S172), and the process ends.

In the present embodiment described above, a configuration has been described in which supply management device 1 provided in house 100 receives a coordination instruction from a user, and transmits a supply start instruction to each of the vehicles 2, 3 and 4. The structure, however, is not restricted. Specifically, the function related to communication control unit 1a of supply management device 1 may be executed by any of the vehicles 2, 3 and 4 in place of supply management device 1.

According to the embodiment of the present invention, each vehicle controls inverter INV3 such that if an AC voltage appears on supply line ACL before starting AC power supply, an AC current synchronized with the detected AC voltage is generated. Therefore, even when an AC power has already been supplied to power load LOAD by a commercial power supply or from another vehicle, it is possible to additionally link each vehicle. Therefore, it becomes possible to supply AC power to the common power load LOAD in a cooperative manner, regardless of the number of vehicles.

Further, according to the embodiment of the present invention, the vehicle determined to be the slave and the master vehicle that does not generate the AC voltage as the voltage reference execute the current control mode to generate an AC current synchronized with the detected AC voltage. Therefore, each of the vehicles can arbitrarily control the supplied AC current, that is, the amount of power to be supplied. As a result, flexible power management of the overall power system becomes possible.

[Modification 1]

In the embodiment described above, a configuration of power system has been described in which, among the plurality of vehicles electrically connected to a common power load LOAD, one as a master vehicle issues control commands to other vehicles. In Modification 1 of the present embodiment, a configuration will be described in which the supply management device issues control commands to each of the vehicles. Specifically, a configuration will be described in which the supply management device is in charge of overall management of the power system.

Schematic configurations of the power system and each of the vehicles in accordance with Modification 1 of the embodiment of the present invention are the same as those shown in FIGS. 1 to 3 and, therefore, detailed description thereof will not be repeated.

Figure 10:
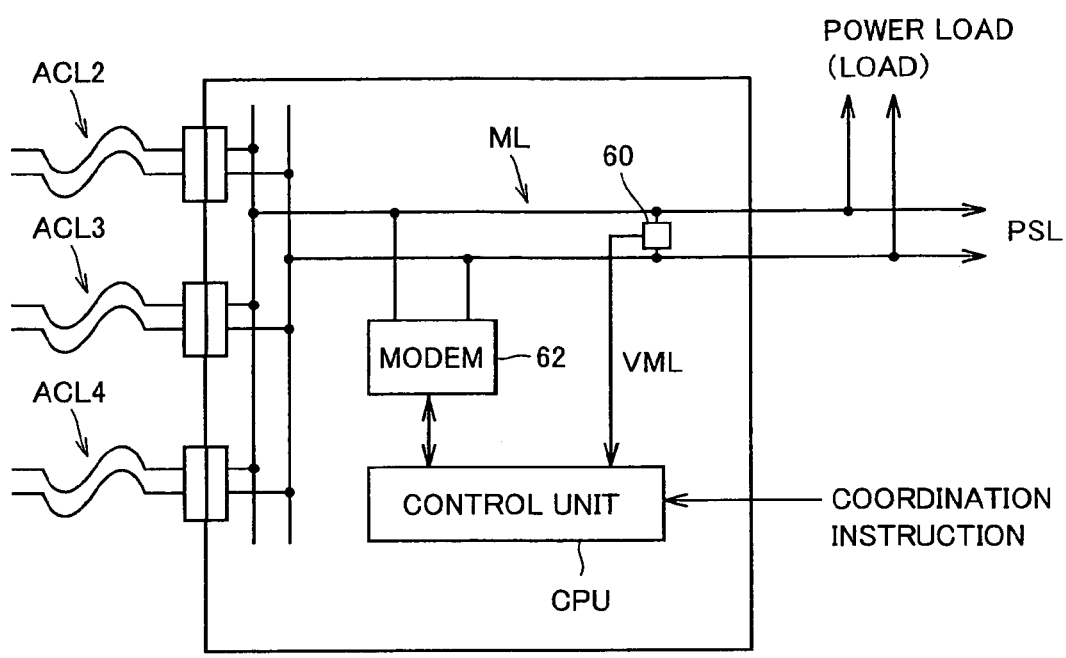
FIG. 10 schematically shows a configuration of a supply management device in accordance with Modification 1 of the embodiment of the present invention.

FIG. 10 shows a supply management device 1# in accordance with Modification 1 of the embodiment, which includes a control unit CPU, a modem 62 and a main line voltage detecting unit 60.

Modem 62 is formed to allow transmission and reception of information between each of the plurality of vehicles electrically connected to the common power load LOAD. Specifically, modem 62 is connected between main lines ML, and by PLC communication through supply line ACL, realizes transmission and reception of information.

Main line voltage detecting unit 60 is connected between main lines ML, detects a voltage supplied to power load LOAD, that is, the main line voltage VML appearing on the main line ML, and outputs the detected value to control unit CPU.

Control unit CPU is formed to allow coordination instruction from a user. Control unit CPU regulates each vehicle such that the plurality of vehicles electrically connected to the common power load LOAD can supply AC power in a coordinated manner. Specifically, receiving the coordination instruction, control unit CPU transmits an identification ID inquiry instruction to each vehicle via modem 62. Then, control unit CPU receives identification ID from each vehicle, via modem 62. Further, control unit CPU determines whether an AC power supplied to power load LOAD is detected by main line voltage detecting unit 60 or not.

If the AC voltage supplied to power load LOAD cannot be detected by main line voltage detecting unit 60, that is, when AC voltage is not applied to main line ML, control unit CPU determines a vehicle of highest priority from the received identification IDs, in accordance with a predetermined determination rule. Then, control unit CPU transmits a voltage reference generation start instruction to the determined vehicle, via modem 22. Specifically, control unit CPU specifies the vehicle for generating the AC voltage to be the voltage reference, and instructs generation of AC voltage. Further, control unit CPU transmits supply start instruction to each of the remaining vehicles other than the vehicle of highest priority. Then, each of the remaining vehicles starts generation of AC current, using the AC voltage generated by the vehicle of highest priority as the voltage reference.

If the AC voltage supplied to power load LOAD can be detected by main line voltage detecting unit 60, that is, when there is an AC voltage on main line ML, control unit CPU transmits the supply start instruction to all the vehicles electrically connected to the common power load LOAD. Then, each vehicle starts generation of AC current using the AC voltage from the commercial power supply as the voltage reference.

In Modification 1 of the embodiment of the present invention, power load LOAD corresponds to the "power consuming unit," inverter INV3 corresponds to the "AC power generating unit," and modem 22 corresponds to the "communication unit." Further, control unit ECU implements the "first AC voltage detecting means," the "first control means," the "second control means," and the "transmission means." Further, control unit CPU implements the "second AC voltage detecting means," "identification data obtaining means," and the "generation start instruction means."

(Overall Sequence of Power System when Commercial Power is Supplied)

Figure 11:
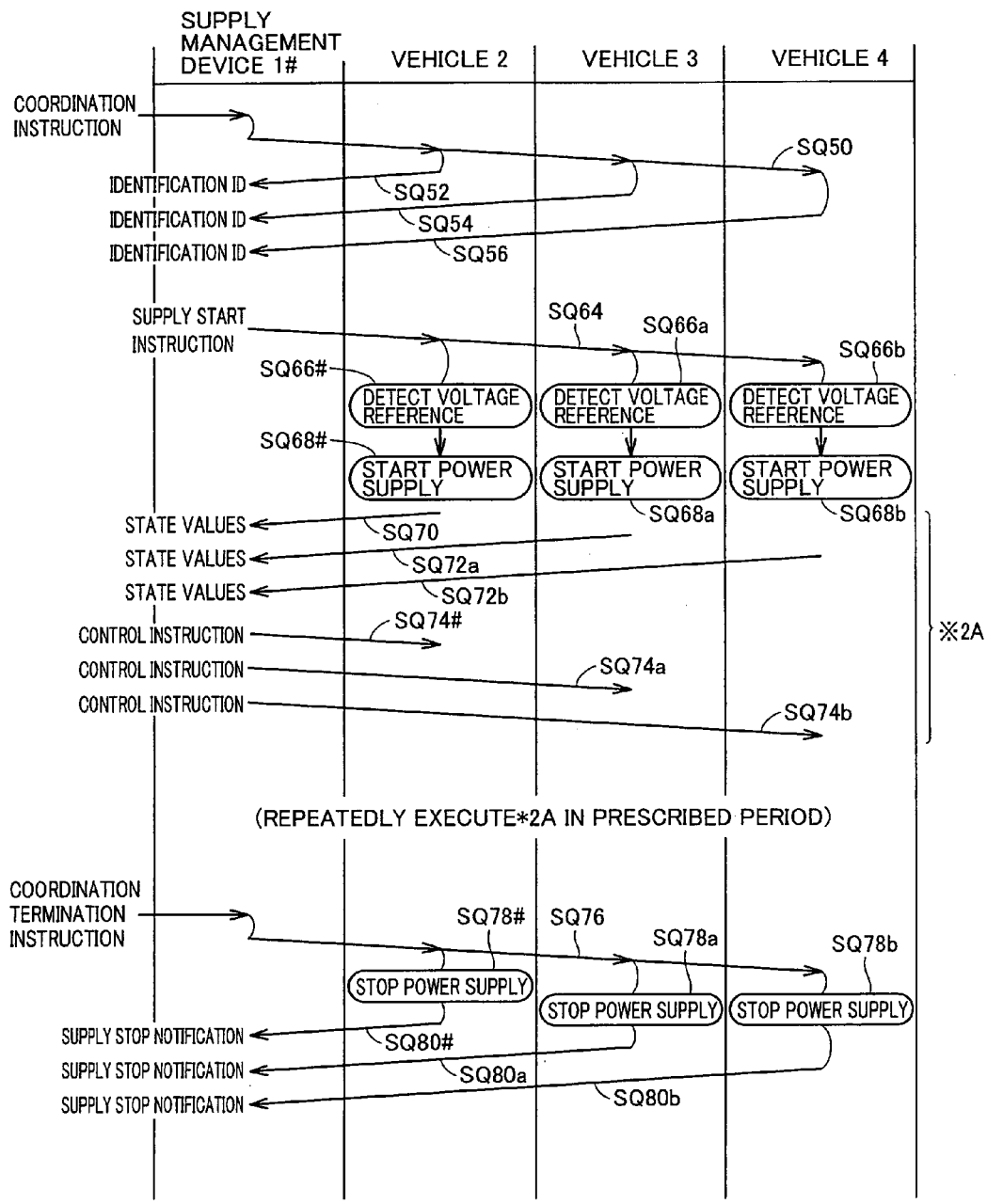
FIG. 11 shows an overall sequence in accordance with Modification 1 of the embodiment of the present invention, when commercial power is supplied to a house.

Referring to FIG. 11, the overall sequence of power system in accordance with Modification 1 of the embodiment of the present invention when commercial power is supplied to house 100 will be described.

In response to a coordination instruction from a user, for example, the supply management device 1# in accordance with Modification 1 of the embodiment of the present invention issues identification ID inquiry instruction to each of the vehicles 2, 3 and 4 (sequence SQ50). Receiving the identification ID inquiry instruction, each of the vehicles 2, 3 and 4 transmits identification ID representing itself to supply management device 1# (sequences SQ52, SQ54, SQ56).

Obtaining identification ID from each of the vehicles 2, 3 and 4, supply management device 1# issues a supply start instruction to each of the vehicles 2, 3 and 4 (sequence SQ64).

Receiving the supply start instruction from supply management device 1#, vehicle 2 detects an AC voltage detected by supply voltage detecting unit 20 as the voltage reference (sequence SQ66#). Then, vehicle 2 controls inverter INV3 such that an AC current synchronized with the detected voltage reference is generated, and starts power supply (sequence SQ68#).

Similarly, receiving the supply start instruction from supply management device 1#, each of the vehicles 3 and 4 detects the AC voltage detected by supply voltage detecting unit 20 as the voltage reference (sequences SQ66*a* and SQ66*b*). Then, each of the vehicles 3 and 4 controls inverter INV3 such that an AC current synchronized with the detected voltage reference is generated, and starts power supply (sequences SQ68*a* and SQ68*b*).

After starting power supply, each of the vehicles 2, 3 and 4 transmits state values of itself to supply management device 1# (sequences SQ70, SQ72*a*, SQ72*b*). Then, based on the state values received from each of the vehicles 2, 3 and 4, supply management device 1# determines a control instruction including a target amount of power to be shared by each vehicle, and transmits the instruction to each of the vehicles 2, 3 and 4 (sequences SQ74#, SQ74*a* and SQ74*b*). Here, each of the vehicles 2, 3 and 4 executes the current control mode and, therefore, it is possible to control the amount of power to be supplied to power load LOAD. Therefore, each of the vehicles 2, 3 and 4 generates the AC current that matches the corresponding target amount of power.

Then, sequences SQ70, SQ72*a*, SQ72*b* and sequences SQ74#, SQ74*a* and SQ74*b* are repeated.

Receiving a coordination termination instruction from the user, supply management device 1# issues a supply end instruction to each of the vehicles 2, 3 and 4 (sequence SQ76). Receiving the supply end instruction from supply management device 1#, each of the vehicles 2, 3 and 4 stops the operation of generating AC power of inverter INV3, and stops power supply (sequences SQ78#, SQ78*a* and SQ78*b*). Thereafter, each of the vehicles 2, 3 and 4 notifies the supply management device 1# that power supply is stopped (sequences SQ80#, SQ80*a* and SQ80*b*).

In this manner, power supply to power load LOAD by vehicles 2, 3 and 4 is stopped.

(Overall Sequence of Power System when Supply of Commercial Power is Stopped)

Figure 12:
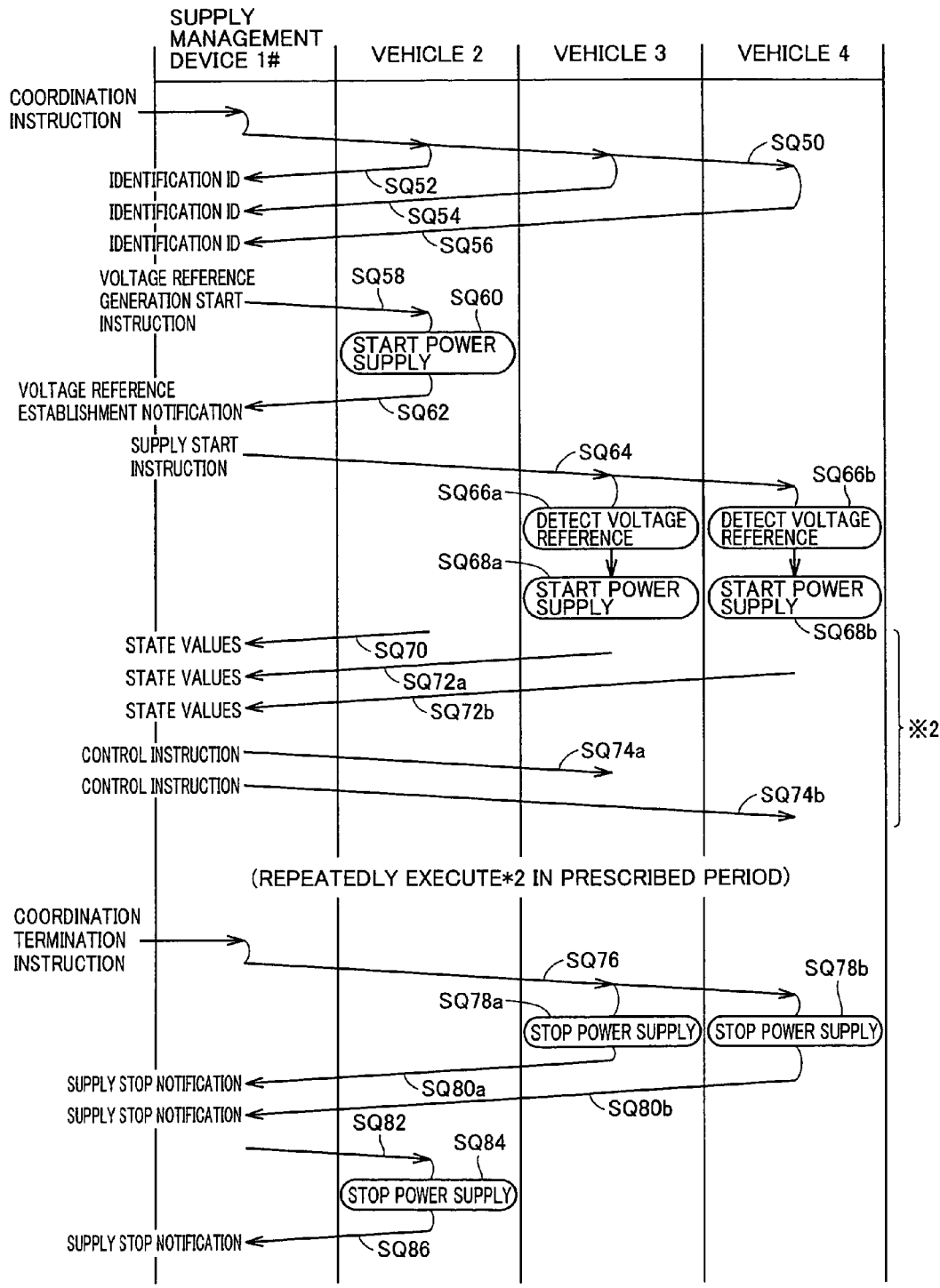
FIG. 12 shows an overall sequence in accordance with Modification 1 of the embodiment of the present invention, when commercial power supply to the house is stopped.

Referring to FIG. 12, an overall sequence of the power system in accordance with Modification 1 of the embodiment of the present invention when commercial power supply to house 100 is stopped, will be described. In FIG. 12 also, an example will be described in which vehicle 2 generates the voltage reference.

In response to a coordination instruction from a user, for example, the supply management device 1# issues identification ID inquiry instruction to each of the vehicles 2, 3 and 4 (sequence SQ50). Receiving the identification ID inquiry instruction, each of the vehicles 2, 3 and 4 transmits identification ID representing itself to supply management device 1# (sequences SQ52, SQ54, SQ56).

Supply management device 1# determines a vehicle of highest priority from the identification IDs transmitted from vehicles 2, 3 and 4 (in FIG. 12, vehicle 2), in accordance with a predetermined determination rule. Then, supply management device #1 transmits a voltage reference generation start instruction to the determined vehicle 2 (sequence SQ58).

Receiving the instruction to start generation of voltage reference from supply management device 1#, vehicle 2 controls inverter INV3 and starts generation of an AC voltage of predetermined frequency (sequence SQ60). Specifically, vehicle 2 generates the AC voltage to be the voltage reference. After the start of power supply, vehicle 2 transmits a notification that the voltage reference is established, to supply management device #1 (sequence SQ62).

Receiving the notification that the voltage reference has been established from vehicle 2, supply management device #1 issues a supply start instruction to each of the vehicles 3 and 4 (sequence SQ64).

Receiving the supply start instruction from supply management device 1#, vehicles 3 and 4 detect the AC voltage detected by supply voltage detecting unit 20 as the voltage reference (sequence SQ66*a* and SQ66*b*). Then, vehicles 3 and 4 control inverter INV3 such that an AC current synchronized with the detected voltage reference is generated, and start power supply (sequences SQ68*a* and SQ68*b*).

After the start of power supply by each of the vehicles 2, 3 and 4, each of the vehicles 2, 3 and 4 transmits the state values of itself to supply management device 1# (sequences SQ70, SQ72*a* and SQ72*b*). Then, based on the state values received from each of vehicles 3 and 4, supply management device 1# determines a control instruction for instructing, for example, the amount of power supply to be shared by each vehicle, and transmits the instruction to each of the vehicles 3 and 4

(sequences SQ74a and SQ74b). Here, each of the vehicles 3 and 4 executes the current control mode and, therefore, it generates the AC current that matches the instructed target amount of power. Vehicle 2 executes the voltage control mode for generating the AC voltage to be the voltage reference. Therefore, the amount of power to be supplied from vehicle 2 is naturally determined to keep balance between the power load LOAD and the amount of power supplied from vehicles 3 and 4.

Thereafter, sequences SQ70, 72a and 72b, and sequences SQ74a and SQ74b are repeated.

Receiving a coordination termination instruction from a user, supply management device 1# issues a supply end instruction to each of the vehicles 3 and 4 (sequence SQ76). Receiving the supply end instruction from supply management device 1#, each of the vehicles 3 and 4 stops the operation of generating AC power of inverter INV3, and stops power supply (sequence SQ78a and SQ78b). Then, each of the vehicles 3 and 4 notifies the supply management device 1# that power supply is stopped (sequence SQ80a and SQ80b).

Thereafter, receiving the supply stop notification from each of the vehicles 3 and 4, supply management device 1# issues a supply end instruction to vehicle 2 (sequence SQ82). In this manner, supply management system 1# issues the supply end instruction to vehicle 2 delayed from the timing when the supply end instruction is issued to vehicles 3 and 4. This is because vehicle 2 is generating the AC voltage serving as the voltage reference.

Receiving the supply end instruction from supply management device 1#, vehicle 2 stops the operation of generating AC power of inverter INV3, and stops power supply (sequence SQ84). Then, vehicle 2 notifies the supply management device 1# that power supply is stopped (sequence SQ86).

In this manner, power supply to power load LOAD by vehicles 2, 3 and 4 is stopped.

(Flowchart)

Figure 13:
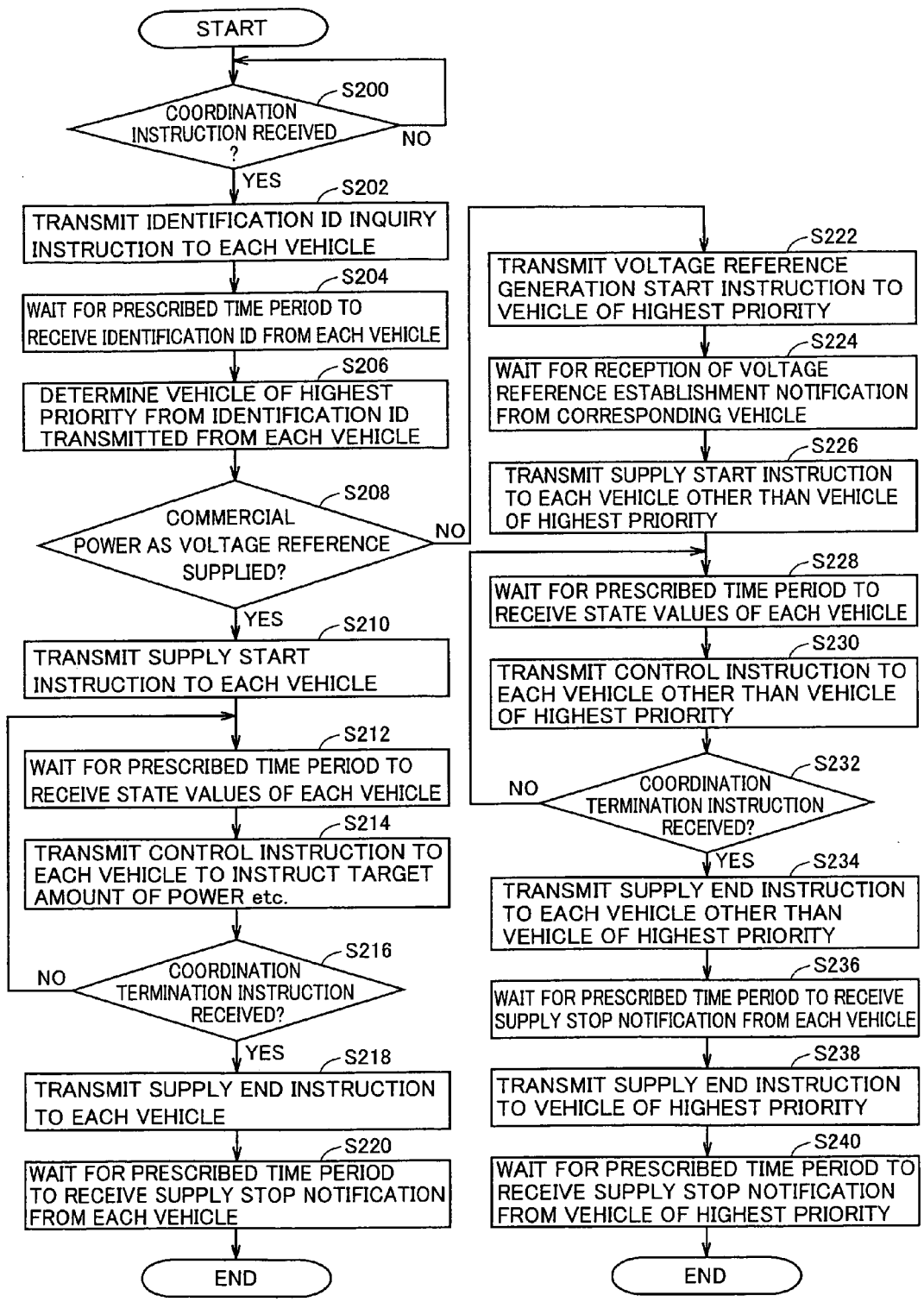
FIG. 13 is a flowchart representing process steps in the supply management device in accordance with Modification 1 of the embodiment of the present invention.

Referring to FIG. 13, process steps in supply management device 1# in accordance with Modification 1 of the embodiment of the present invention will be described.

Control unit CPU of supply management device 1# determines whether or not a coordination instruction has been received from the outside (step S200). If the coordination instruction has not been received (NO at step S200), control unit CPU waits for reception of the coordination instruction.

If the coordination instruction has been received (YES at step S200), control unit CPU transmits an identification ID inquiry instruction to each of the vehicles electrically connected to a common power load LOAD (step S202). Thereafter, control unit CPU waits for a prescribed time period to receive identification IDs from the vehicles (step S204). Then, control unit CPU determines a vehicle of highest priority from the identification IDs transmitted from the vehicles, in accordance with a predetermined determination rule (step S206).

Then, control unit CPU further determines whether the commercial power as the voltage reference is supplied or not (step S208).

If the commercial power is supplied (YES at step S208), control unit CPU transmits a supply start instruction to each vehicle (step S210). After each vehicle starts power supply to power load LOAD, control unit CPU waits for a prescribed time period to receive state values from each vehicle (step S212). Then, based on the state values received from each vehicle, control unit CPU transmits a control instruction for instructing, for example, the target amount of power, to each vehicle (step S214).

Further, control unit CPU determines whether or not a coordination termination instruction has been received from the outside (step S216). If the coordination termination instruction has not been received (NO at step S216), control unit CPU repeatedly executes steps S212 to S216 described above. If the coordination termination instruction has been received (YES at step S216), a supply end instruction is transmitted to each vehicle (step S218). Then, control unit CPU waits for a prescribed time period to receive supply stop notification from each vehicle (step S220). Receiving supply stop notification from every vehicle, control unit CPU ends the process.

When the commercial power is not supplied (NO at step S208), control unit CPU transmits an instruction to start generation of a voltage reference to the vehicle of highest priority determined at step S206 (step S222). Then, control unit CPU waits for reception of a notification that the voltage reference is established, from the vehicle (step S224). Receiving the notification that the voltage reference has been established, control unit CPU transmits supply start instruction to each of the remaining vehicle(s) other than the vehicle of highest priority (step S226). After each vehicle starts power supply to power load LOAD, control unit CPU waits for a prescribed time period to receive state values from the vehicles (step S228). Then, based on the state values received from each vehicle, control unit CPU transmits a control instruction for instructing, for example, the target amount of power, to each of the remaining vehicle(s) other than the vehicle of highest priority (step S230).

Further, control unit CPU determines whether or not the coordination termination instruction has been received from the outside (step S232). If the coordination termination instruction has not been received (NO at step S232), control unit CPU repeatedly executes steps S228 to S232 described above. If the coordination termination instruction has been received (YES at step S232), control unit CPU transmits a supply end instruction to each of the remaining vehicle(s) other than the vehicle of highest priority (step S234). Then, control unit CPU waits for a prescribed time period to receive supply stop notification from each of the corresponding vehicles (step S236). Receiving supply stop notification from every corresponding vehicle, control unit CPU transmits the supply end instruction to the vehicle of highest priority (step S238). Further, control unit CPU waits for a prescribed time period to receive the supply stop notification from the vehicle of highest priority (step S240). Receiving the supply stop notification from the vehicle of highest priority, control unit CPU ends the process.

Figure 14:
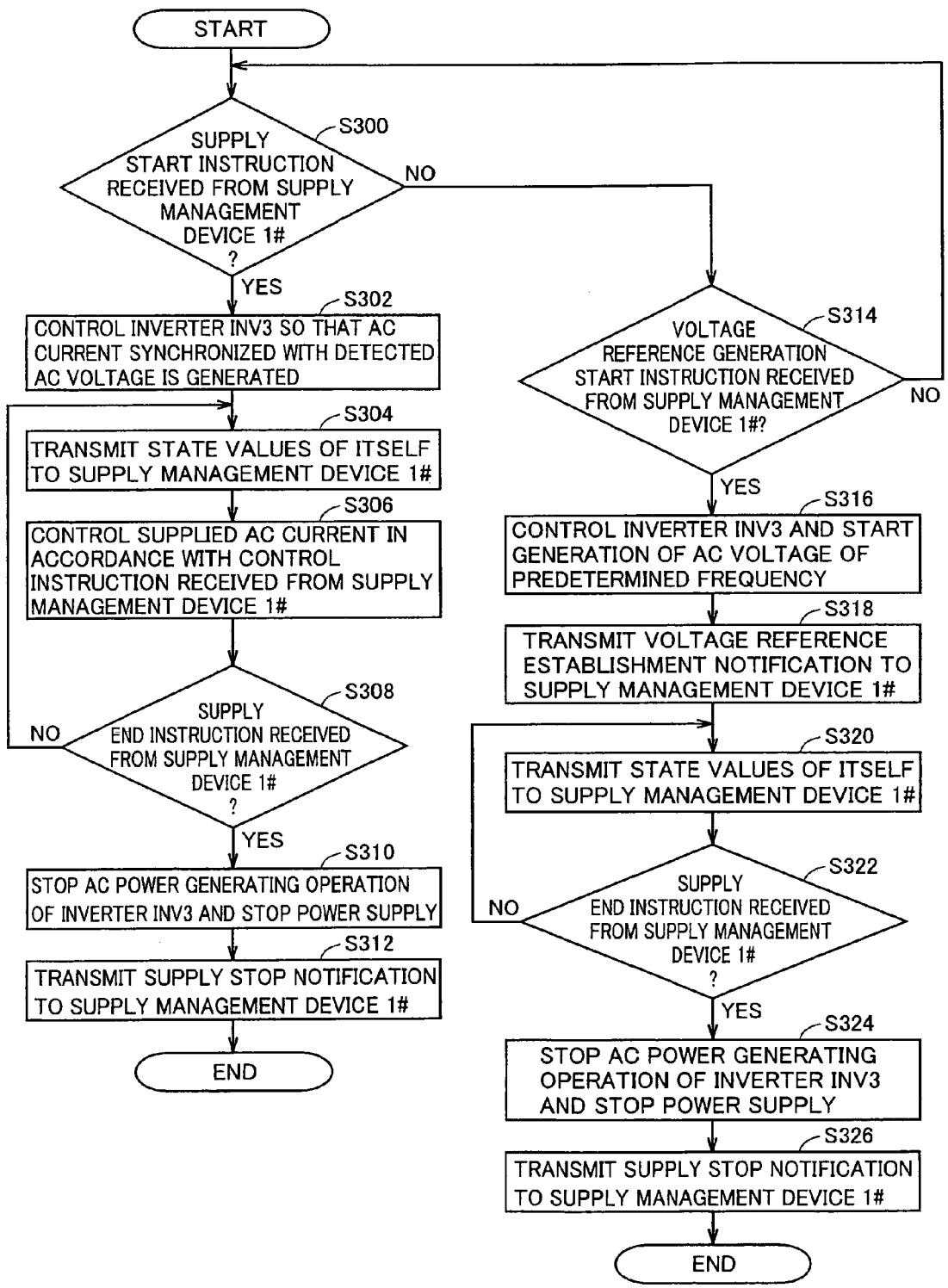
FIG. 14 is a flowchart representing process steps in each vehicle in accordance with Modification 1 of the embodiment of the present invention.

Referring to FIG. 14, process steps in each vehicle in accordance with Modification 1 of the embodiment of the present invention will be described.

Control unit ECU of each vehicle determines whether the supply start instruction has been received via modem 22 or not (step S300).

If the supply start instruction has been received (YES at step S300), control unit ECU starts control of inverter INV3 so that an AC current synchronized with the AC voltage detected by supply voltage detecting unit 20 is generated (step S302). Thereafter, control unit ECU transmits state values of itself to supply management device 1# (step S304). Then, control unit ECU controls the AC current to be supplied, in accordance with the control instruction received from supply management device 1# (step S306).

Further, control unit ECU determines whether or not the supply end instruction has been received from supply management device #1 via modem 22 (step S308). If the supply end instruction has not been received (NO at step S308), control unit ECU repeatedly executes step S304 to S308 described above. If the supply end instruction has been received (YES at step S308), control unit ECU stops the operation of generating AC power of inverter IV3, and stops power supply (step S310). Further, control unit ECU transmits the notification that power supply is stopped to supply management device 1# (step S312), and the process ends.

If the supply stop instruction is not received (NO at step S300), control unit ECU determines whether or not an instruction to start generation of voltage reference has been received from supply management device 1# via modem 22 (step S314). If the instruction to start generation of voltage reference is not received (NO at step S314), control unit ECU repeatedly executes steps S300 and S314 described above.

If the instruction to start generation of voltage reference is received (YES at step S314), control unit ECU controls inverter INV3 so that generation of an AC voltage of a predetermined frequency starts (step S316). Thereafter, control unit ECU transmits the notification that voltage reference is established, to supply management device 1# (step S318). Then, control unit ECU transmits state values of itself to supply management device 1# (step S320).

Further, control unit ECU determines whether or not the supply end instruction has been received from supply management device 1# via modem 22 (step S322). If the supply end instruction has not been received (NO at step S322), control unit ECU repeatedly executes steps S320 and S322 described above. If the supply end instruction has been received (YES at step S322), control unit ECU stops the operation of generating AC power of inverter INV3, and stops power supply (step S342). Further, control unit ECU transmits power supply stop notification to supply management device 1# (step S326), and the process ends.

According to Modification 1 of the embodiment of the present invention, similar effects as attained by the embodiment described above can be attained. Further, according to Modification 1 of the embodiment of the present invention, supply management device 1# attains the function related to supply management of the determining means of the master vehicle and, therefore, processes executed by each vehicle can be simplified. Therefore, by standardizing voltage of supplied power or PLC communication protocol and the like, it becomes possible to provide with a power system including various vehicles, regardless of the manufacturer.

[Modification 2]

In power systems in accordance with the embodiment and Modification 1 of the present invention, a configuration has been described in which power is supplied to power load LOAD using inverter INV3, which is arranged separate from inverters INV1 and INV2 for driving motor generators MG1 and MG2 in each vehicle. In Modification 2 of the embodiment of the present invention, a configuration will be descried in which inverter INV3 is not provided and inverters INV1 and INV2 implement both driving of motor generators MG1 and MG2 and power supply to power load LOAD.

Figure 15:
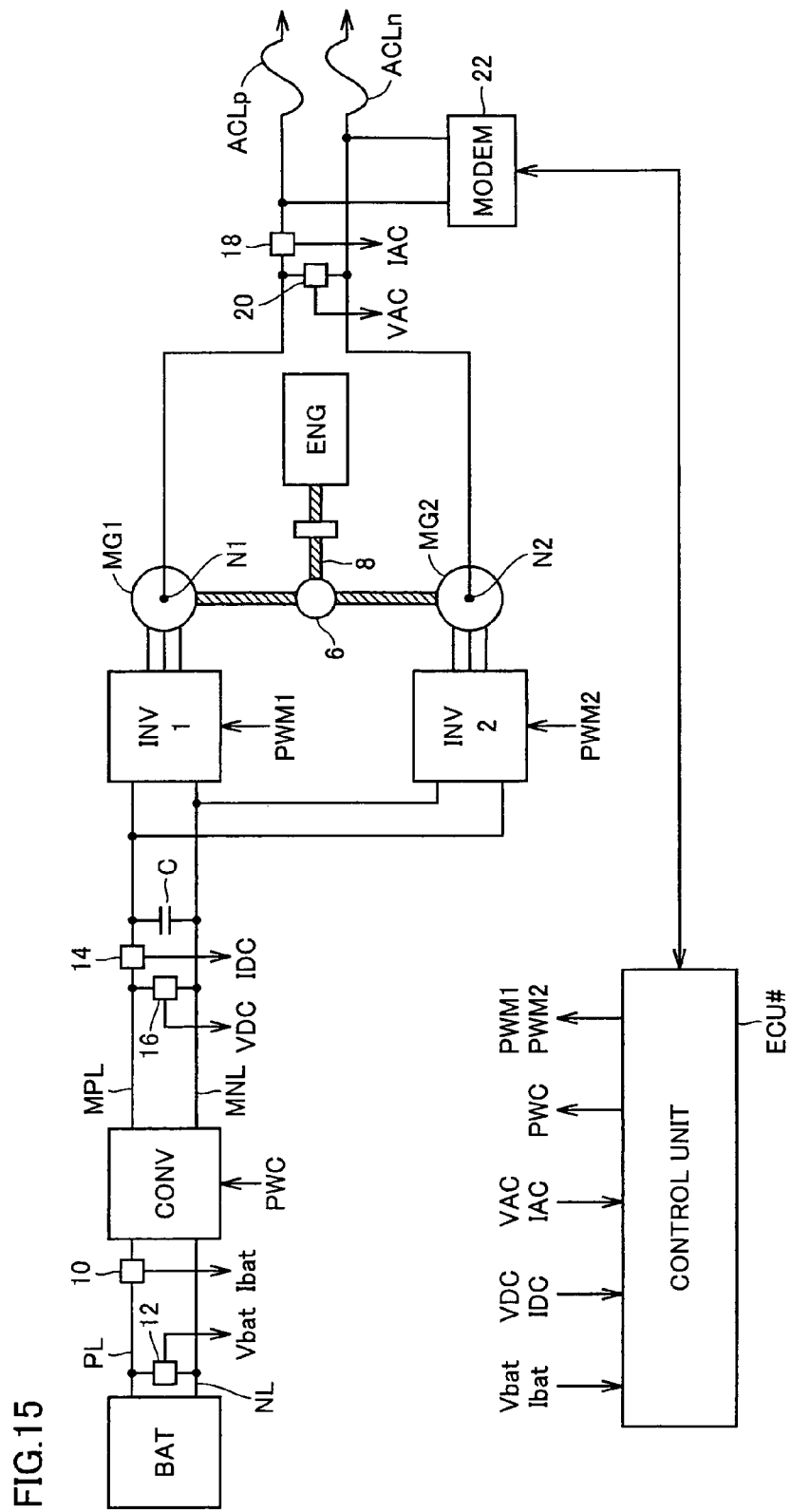
FIG. 15 schematically shows a configuration of each of the vehicles in accordance with Modification 2 of the embodiment of the present invention.

Referring to FIG. 15, the vehicle in accordance with Modification 2 of the present embodiment corresponds to the configuration of FIG. 3, in which inverter INV3 is removed, and connection of positive supply line ACLp and negative supply line ACLn is changed to a neutral point N1 of motor generator MG1 and neutral point N2 of motor generator MG2, respectively.

As described above, motor generators MG1 and MG2 are three-phase AC rotating machines having rotors in which permanent magnets are embedded. Further, in Modification 2 of the embodiment of the present invention, motor generators MG1 and MG2 include stators with Y-connected (star-connected) three-phase coils. In the Y-connection, the node at which coils are connected to each other corresponds to the neutral point N1 or N2 of motor generator MG1 or MG2.

As described above, inverters INV1 and INV2 are formed of bridge circuits including switching elements of three phases. Specifically, inverters INV1 and INV2 each include three switching elements on the upper arm side (positive side) and three switching elements on the lower arm side (negative side). When three-phase AC power is to be generated from inverter INV1 or INV2, one of the switching elements on the upper arm side and one of the switching elements on the lower arm side are switched with time and driven to the on-state.

It is also possible to collectively turn on/off the three switching elements on each of the upper and lower arm sides. In such an operation mode, three switching elements on the upper arm side can be regarded as in the same switching state (all on or all off), and three switching elements on the lower arm side can be regarded as in the same switching state.

In such an operation mode, respective phase voltages come to be equal to each other and, therefore, a zero voltage vector with the neutral point being the reference can be defined.

Figure 16:
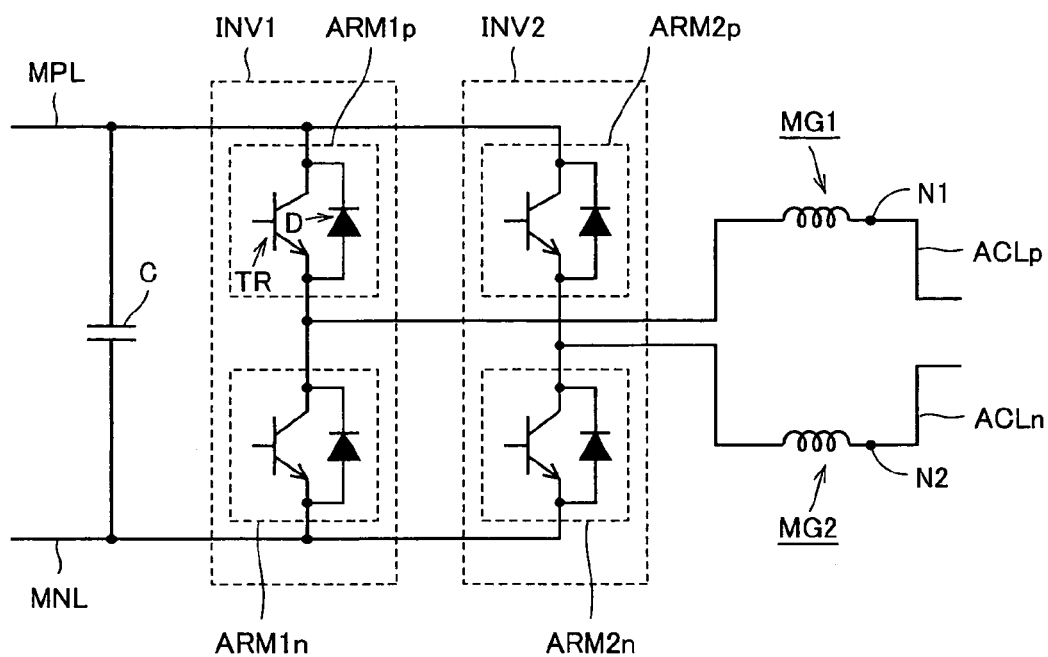
FIG. 16 is a zero-phase equivalent circuit diagram of an inverter and a motor generator when a zero-voltage vector is generated.

FIG. 16 is a zero-phase equivalent circuit of inverters INV1 and INV2 and motor generators MG1 and MG2, when the zero voltage vector is generated.

Referring to FIG. 16, when inverters INV1 and INV2 execute an operation mode that generates the zero-voltage vector as described above, the three switching elements TR on the upper arm side of inverter INV1 will be collectively represented as upper arm ARM1$p$, and the three switching elements TR on the lower arm side of inverter INV1 will be collectively represented as lower arm ARM1$n$. Similarly, the three switching elements on the upper arm side of inverter INV2 will be collectively represented as upper arm ARM2$p$, and the three switching elements on the lower arm side of inverter INV2 will be collectively represented as lower arm ARM2$n$.

The zero-phase equivalent circuit shown in FIG. 16 may be regarded as a single-phase inverter that converts the DC power supplied through main positive power line MPL and main negative power line MNL to a single-phase AC power and outputs the converted single-phase AC power from neutral points N1 and N2 through positive supply line ACLp and negative supply line ACLn.

Therefore, by changing with time the zero voltage vector in each of the inverters INV1 and INV2 and controlling switching of inverters INV1 and INV2 such that each of the inverters operate as a single-phase inverter, it becomes possible to generate AC power from the discharge power from electric storage unit BAT and to supply the power to power load LOAD.

Except for these points, the configuration is the same as that of the vehicle shown in FIG. 3 and, therefore, detailed description will not be repeated.

Power system sequence and process flows in accordance with Modification 2 of the embodiment are also the same as those of the embodiment or Modification 1 of the present invention described above and, therefore, detailed description will not be repeated.

According to Modification 2 of the embodiment, in addition to the effects attained by the embodiment of the present invention, configuration of each vehicle can be simplified. Therefore, the power system in accordance with the present invention can be implemented at a lower cost.

Further, in the embodiment and in Modifications 1 and 2 thereof, a power system consisting solely of hybrid vehicles has been illustrated. A configuration may be possible in which vehicles of different types such as electric vehicles, hybrid vehicles and fuel cell vehicles are included in a common power system.

In the embodiment and in Modifications 1 and 2 of the present invention, mainly an example in which power is supplied from each vehicle to power load LOAD has been described. The present invention is similarly applicable when each vehicle is charged by the commercial power supply. Specifically, by setting the target amount of power to be supplied to each vehicle executing the current control mode to a value of opposite polarity to the power supply side, it is possible to charge electric storage BAT of each vehicle, while maintaining the same configuration.

Further, in the embodiment and in Modifications 1 and 2 thereof, a configuration has been described in which communication between vehicles or between a vehicle and the supply management device is implemented by PLC communication using supply lines. The method of communication is not restricted. By way of example, radio communication such as portable telephone, PHS, wireless LAN and Bluetooth (registered trademark) may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power system electrically connected to a power consuming unit and allowing transfer of AC power to/from said power consuming unit, comprising
    a plurality of electric vehicles each configured to be able to supply AC power; wherein
    said plurality of electric vehicles are commonly connected electrically to said power consuming unit; and
    each of said plurality of electric vehicles includes;
    a rechargeable electric storage unit,
    an AC power generating unit receiving discharge power from said electric storage unit for generating AC power,
    a supply line for electrically connecting said AC power generating unit and said power consuming unit,
    first AC voltage detecting means for detecting an AC voltage appearing on said supply line, and
    first control means for controlling said AC power generating unit such that when the AC voltage appears on said supply line, an AC current synchronized with the detected AC voltage is generated.

2. The power system according to claim 1, wherein
    each of said plurality of electric vehicles further includes;
    a communication unit capable of transmission and reception of information to/from other electric vehicle or vehicles,
    transmitting means for transmitting identification data representing itself to said other electric vehicle or vehicles via said communication means,
    receiving means for obtaining said identification data from said other electric vehicle or vehicles received via said communication means,
    priority comparing means for comparing said identification data of itself with said identification data of said other electric vehicle or vehicles obtained by said receiving means based on a predetermined determination rule,
    master notification means for notifying to said other electric vehicle or vehicles that it is a master among said plurality of electric vehicles, if priority of said identification data of itself is the highest as compared with said identification data of said other electric vehicle or vehicles, and
    second control means for controlling said AC power generating unit so that an AC voltage of a predetermined frequency is generated, when no AC voltage appears on said supply line, after said master notification means notifies to said other electric vehicle or vehicles.

3. The power system according to claim 2, further comprising
    a supply management unit for managing supply of AC power from said plurality of electric vehicles; wherein
    said communication unit is capable of additionally receiving information from said supply management unit;
    said supply management unit issues a supply start instruction to each of said plurality of electric vehicles in response to an external instruction; and
    each of said plurality of electric vehicles starts supply of AC power after receiving said supply start instruction from said supply management unit.

4. The power system according to claim 1, further comprising
    a supply management unit for managing supply of AC power from said plurality of electric vehicles; wherein
    each of said plurality of electric vehicles further includes;
    a communication unit capable of transmission and reception of information to/from said supply management unit and
    transmitting means for transmitting identification data representing itself to said supply management unit via said communication means;
    said supply management unit includes;
    second AC voltage detecting means for detecting an AC voltage supplied to said power consuming unit,
    identification data obtaining means for obtaining said identification data transmitted from each of said plurality of electric vehicles,
    priority determining means for determining an electric vehicle of highest priority from said identification data obtained by said identification data obtaining means based on a predetermined determination rule, and
    generation start instructing means for applying an instruction to start generation of a voltage reference to the electric vehicle determined by said priority determining means, when there is no AC voltage supplied to said power consuming unit; and
    each of said plurality of electric vehicles further includes second control means for controlling said AC power generating unit such that an AC voltage of predetermined frequency is generated when said generation start instruction is received from said supply management unit.

5. The power system according to claim 4, wherein
    said supply management unit applies the supply start instruction to each of said plurality of electric vehicles in response to an external instruction; and
    each of said plurality of electric vehicles starts supply of AC power after receiving said supply start instruction from said supply management unit.

6. The power system according to claim 1, wherein
    said first control means establishes synchronization with the AC voltage, based on a timing of zero-cross point of the AC voltage detected by said first AC voltage detecting means.

7. The power system according to claim 2, wherein
    said communication unit is formed to perform information transmission and information reception through corresponding said supply line.

8. The power system according to claim 1, wherein
    said power consuming unit is configured to allow supply of AC power from other than said plurality of electric vehicles, from a node between said plurality of electric vehicles and said power consuming unit.

9. The power system according to claim 1, wherein
said AC power generating unit includes;
first and second rotating electric machines each formed to include a star-connected stator, and
first and second inverters for driving said first and second rotating electric machines, respectively;
said supply line is configured to electrically connect a first neutral point of said first rotating electric machine and a second neutral point of said second rotating electric machine to said power consuming unit; and
each of said first and second inverters is capable of switching operation such that a single-phase AC voltage is generated between said first neutral point and said second neutral point.

10. A power system electrically connected to a power consuming unit and allowing transfer of AC power to/from said power consuming unit, comprising
a plurality of electric vehicles each configured to be able to supply AC power; wherein
said plurality of electric vehicles are commonly connected electrically to said power consuming unit; and
each of said plurality of electric vehicles includes;
a rechargeable electric storage unit,
an AC power generating unit receiving discharge power from said electric storage unit for generating AC power,
a supply line for electrically connecting said AC power generating unit and said power consuming unit,
a supply voltage detecting unit detecting a voltage appearing on said supply line, and
a control unit; and
said control unit controls said AC power generating unit such that, when said supply voltage detecting unit detects an AC voltage appearing on said supply line, an AC current synchronized with the detected AC voltage appears.

11. A method of supplying AC power for supplying AC power from a plurality of electric vehicles each capable of supplying AC power, to a power consuming unit, wherein
each of said plurality of electric vehicles includes;
a rechargeable electric storage unit,
an AC power generating unit receiving discharge power from said electric storage unit and generating AC power, and
a supply line for electrically connecting said AC power generating unit to said power consuming unit;
said AC power supplying method comprising the steps of
each of said plurality of electric vehicles detecting an AC voltage appearing on said supply line; and
controlling said AC power generating unit such that, in said electric vehicle having said AC voltage appearing on said supply line, an AC current synchronized with the detected AC voltage is generated.

12. The method of supplying AC power according to claim 11, wherein
each of said plurality of electric vehicles further includes a communication unit capable of transmitting and receiving information to/from other electric vehicle or vehicles;
said method of supplying AC power further comprising the steps of:
each of said plurality of electric vehicles transmitting identification data representing itself to said other electric vehicle or vehicles via said communication unit;
each of said plurality of electric vehicles obtaining said identification data from said other electric vehicle or vehicles received via said communication unit;
each of said plurality of electric vehicles comparing said identification data of itself with said received identification data of said other electric vehicle or vehicles based on a predetermined determination rule;
each of said plurality of electric vehicles notifying to said other electric vehicle or vehicles, when identification data of itself is the highest as compared with said identification data of said other electric vehicle or vehicles, that it is a master among said plurality of electric vehicles; and
in said electric vehicle having no AC voltage appearing on said supply line, after notification to said other electric vehicle or vehicles, controlling said AC power generating unit such that an AC voltage of a predetermined frequency is generated.

13. The method of supplying AC power according to claim 12, implemented by, in addition to said plurality of electric vehicles, a supply management unit for managing supply of AC power from said plurality of electric vehicles; wherein
said communication unit is capable of receiving information from said supply management unit;
said method of supplying AC power further comprising the steps of:
said supply management unit issuing a supply start instruction to each of said plurality of electric vehicles in response to an external instruction; and
after receiving said supply start instruction from said supply management unit, each of said plurality of electric vehicles starting supply of AC power.

14. The method of supplying AC power according to claim 11, implemented by, in addition to said plurality of electric vehicles, a supply management unit for managing supply of AC power from said plurality of electric vehicles; wherein
each of said plurality of electric vehicles further includes a communication unit capable of transmitting and receiving information to/from said supply management unit;
said method of supplying AC power comprising the steps of:
each of said plurality of electric vehicles transmitting identification data representing itself to said supply management unit via said communication unit;
said supply management unit detecting an AC voltage supplied to said power consuming unit;
said supply management unit obtaining said identification data transmitted from each of said plurality of electric vehicles;
said supply management unit determining an electric vehicle of highest priority from said obtained identification data, based on a predetermined determination rule;
said supply management unit applying, when no AC voltage is supplied to said power consuming unit, an instruction to start generation of a voltage reference to said determined electric vehicle; and
in said electric vehicle receiving said generation start instruction from said supply management unit, controlling said AC power generating unit such that an AC voltage of a predetermined frequency is generated.

15. The method of supplying AC power according to claim 14, further comprising the steps of:
said supply management unit applying the supply start instruction to each of said plurality of electric vehicles, in response to an external instruction; and
after receiving said supply start instruction from said supply management unit, each of said plurality of electric vehicles starting supply of AC power.

* * * * *